US008983412B2

(12) United States Patent
Featherstone et al.

(10) Patent No.: US 8,983,412 B2
(45) Date of Patent: *Mar. 17, 2015

(54) MONITORING MOBILE DEVICE CONTEXT

(71) Applicant: Aegis Mobility, Inc., Vancouver (CA)

(72) Inventors: Peter A. Featherstone, Surrey (CA); Andrew S. Wright, Vancouver (CA); Mandy Chan, Vancouver (CA); John J. Geyer, Vancouver (CA); Stephen J. Williams, Vancouver (CA)

(73) Assignee: Aegis Mobility, Inc., Burnaby (CA)

( * ) Notice: Subject to any disclaimer, the term of this patent is extended or adjusted under 35 U.S.C. 154(b) by 189 days.

This patent is subject to a terminal disclaimer.

(21) Appl. No.: 13/775,065

(22) Filed: Feb. 22, 2013

(65) Prior Publication Data

US 2014/0057616 A1 Feb. 27, 2014

Related U.S. Application Data

(63) Continuation of application No. 13/175,793, filed on Jul. 1, 2011, now Pat. No. 8,385,901, which is a continuation of application No. 12/040,842, filed on Feb. 29, 2008, now Pat. No. 8,000,689.

(60) Provisional application No. 60/892,628, filed on Mar. 2, 2007.

(51) Int. Cl.
*H01Q 11/12* (2006.01)
*H04M 1/725* (2006.01)
(Continued)

(52) U.S. Cl.
CPC ............ *H04M 1/72569* (2013.01); *H04W 4/02* (2013.01); *H04L 67/303* (2013.01);
(Continued)

(58) Field of Classification Search
USPC ........... 455/127.5, 574, 418, 456-456.6, 404, 455/522, 311, 318; 370/311, 318
See application file for complete search history.

(56) References Cited

U.S. PATENT DOCUMENTS 5,852,775 A 12/1998 Hidary
5,862,476 A 1/1999 Hasegawa
(Continued)

FOREIGN PATENT DOCUMENTS

EP 1931109 A1 6/2008
WO WO 02/25070 A1 3/2002
(Continued)

*Primary Examiner* — Charles Appiah
*Assistant Examiner* — Edward Zhang
(74) *Attorney, Agent, or Firm* — Knobbe, Martens, Olson & Bear, LLP

(57) ABSTRACT

Systems, methods and interfaces are disclosed for managing communications associated with a mobile communication device. Mobile communication devices process environmental inputs and transmit mobile communication device context information to a communication management system. The context information may, for example, reflect the motion and/or geographic location of the mobile device, and may reflect the risk associated with using the device to handle a call or other communications session. The communication management system uses the context information, optionally in combination with communication device profiles, to determine how to manage incoming and/or ongoing calls or other communication sessions. Mobile device users may also be inhibited from initiating communication sessions.

18 Claims, 26 Drawing Sheets

(51) Int. Cl.

| | |
|---|---|
| *H04W 4/02* | (2009.01) |
| *H04L 29/08* | (2006.01) |
| *H04W 4/04* | (2009.01) |
| *H04W 52/02* | (2009.01) |
| *H04W 64/00* | (2009.01) |
| *H04W 68/00* | (2009.01) |
| *H04W 8/18* | (2009.01) |

(52) U.S. Cl.
CPC ............. *H04W 4/027* (2013.01); *H04W 4/046* (2013.01); *H04W 52/0251* (2013.01); *H04W 64/006* (2013.01); *H04M 1/72577* (2013.01); *H04W 68/00* (2013.01); *H04W 8/18* (2013.01)
USPC ...... 455/127.5; 455/574; 455/418; 455/456.1; 455/456.2; 455/456.3; 455/456.4; 455/456.6; 455/404.2; 455/522

(56) References Cited

U.S. PATENT DOCUMENTS

| | | | |
|---|---|---|---|
| 5,890,061 A | 3/1999 | Timm et al. |
| 5,890,067 A | 3/1999 | Chang et al. |
| 5,963,550 A | 10/1999 | Hirata et al. |
| 6,154,172 A | 11/2000 | Piccionelli et al. |
| 6,198,927 B1 | 3/2001 | Wright et al. |
| 6,208,866 B1 | 3/2001 | Rouhollahzadeh et al. |
| 6,263,190 B1 | 7/2001 | Mamori et al. |
| 6,311,078 B1 | 10/2001 | Hardouin |
| 6,353,778 B1 | 3/2002 | Brown |
| 6,389,287 B1 | 5/2002 | Smith et al. |
| 6,418,309 B1 | 7/2002 | Moon et al. |
| 6,496,709 B2 | 12/2002 | Murray |
| 6,505,046 B1 | 1/2003 | Baker |
| 6,526,275 B1 | 2/2003 | Calvert |
| 6,546,257 B1 | 4/2003 | Stewart |
| 6,580,973 B2 | 6/2003 | Leivian et al. |
| 6,594,483 B2 | 7/2003 | Nykanen et al. |
| 6,598,034 B1 | 7/2003 | Kloth et al. |
| 6,600,975 B2 | 7/2003 | Moriguchi et al. |
| 6,647,257 B2 | 11/2003 | Owensby |
| 6,647,269 B2 | 11/2003 | Hendrey et al. |
| 6,650,894 B1 | 11/2003 | Berstis et al. |
| 6,678,516 B2 | 1/2004 | Nordman et al. |
| 6,687,497 B1 | 2/2004 | Parvulescu et al. |
| 6,690,940 B1 | 2/2004 | Brown et al. |
| 6,701,158 B2 | 3/2004 | Moreth |
| 6,714,519 B2 | 3/2004 | Luzzatti et al. |
| 6,728,542 B2 | 4/2004 | Meda |
| 6,731,925 B2 | 5/2004 | Naboulsi |
| 6,771,946 B1 | 8/2004 | Oyasaki |
| 6,807,435 B2 | 10/2004 | Yamashita |
| 6,816,731 B1 | 11/2004 | Maruyama |
| 6,819,928 B1 | 11/2004 | Hokao |
| 6,832,093 B1 | 12/2004 | Ranta |
| 6,847,822 B1 | 1/2005 | Dennison et al. |
| 6,885,869 B2 | 4/2005 | Raith |
| 6,922,571 B1 | 7/2005 | Kinoshita |
| 6,934,547 B2 | 8/2005 | Suzuki |
| 6,961,561 B2 | 11/2005 | Himmel et al. |
| 6,973,333 B1 | 12/2005 | O'Neil |
| 6,978,136 B2 | 12/2005 | Jenniges et al. |
| 7,003,525 B1 | 2/2006 | Horvitz et al. |
| 7,006,793 B2 | 2/2006 | Himmel et al. |
| 7,015,831 B2 | 3/2006 | Karlsson et al. |
| 7,064,656 B2 | 6/2006 | Belcher et al. |
| 7,072,753 B2 | 7/2006 | Eberle et al. |
| 7,110,749 B2 | 9/2006 | Zellner et al. |
| 7,149,627 B2 | 12/2006 | Ockerse et al. |
| 7,181,228 B2 | 2/2007 | Boesch |
| 7,242,946 B2 | 7/2007 | Kokkonen et al. |
| 7,269,627 B2 | 9/2007 | Knauerhase |
| 7,330,895 B1 | 2/2008 | Horvitz |
| 7,359,713 B1 | 4/2008 | Tiwari |
| 7,359,714 B2 | 4/2008 | Parupudi et al. |
| 7,394,791 B2 | 7/2008 | Proctor, Jr. |
| 7,403,785 B2 | 7/2008 | Daniels et al. |
| 7,430,724 B2 | 9/2008 | Othmer |
| 7,813,741 B2 | 10/2010 | Hendrey et al. |
| 7,979,057 B2 | 7/2011 | Ortiz et al. |
| 8,045,976 B2 | 10/2011 | Kiddie et al. |
| 8,224,353 B2 | 7/2012 | Wright et al. |
| 2002/0168981 A1 | 11/2002 | Meda |
| 2002/0198004 A1 | 12/2002 | Heie et al. |
| 2003/0129995 A1 | 7/2003 | Niwa et al. |
| 2003/0137408 A1 | 7/2003 | Breiner |
| 2003/0143988 A1 | 7/2003 | Jamadagni |
| 2004/0092253 A1 | 5/2004 | Simonds et al. |
| 2004/0156333 A1 | 8/2004 | Bush |
| 2004/0166878 A1 | 8/2004 | Erskine et al. |
| 2004/0198332 A1 | 10/2004 | Lundsgaard |
| 2004/0203900 A1 | 10/2004 | Cedervall et al. |
| 2004/0248589 A1 | 12/2004 | Gwon et al. |
| 2004/0253963 A1 | 12/2004 | Park et al. |
| 2005/0037760 A1 | 2/2005 | Maruyama |
| 2005/0070298 A1 | 3/2005 | Caspi et al. |
| 2005/0096026 A1 | 5/2005 | Chitrapu et al. |
| 2005/0119002 A1 | 6/2005 | Bauchot et al. |
| 2005/0153680 A1 | 7/2005 | Yoshioka et al. |
| 2005/0255874 A1 | 11/2005 | Stewart-Baxter et al. |
| 2005/0261011 A1 | 11/2005 | Scott |
| 2005/0264404 A1 | 12/2005 | Franczyk et al. |
| 2006/0040640 A1 | 2/2006 | Thompson et al. |
| 2006/0046765 A1 | 3/2006 | Kogure |
| 2006/0099940 A1 | 5/2006 | Pfleging et al. |
| 2006/0099959 A1 | 5/2006 | Staton et al. |
| 2006/0099969 A1 | 5/2006 | Staton et al. |
| 2006/0104297 A1 | 5/2006 | Buyukkoc et al. |
| 2006/0116807 A1 | 6/2006 | Hijikata |
| 2006/0148490 A1 | 7/2006 | Bates et al. |
| 2006/0211412 A1 | 9/2006 | Vance |
| 2006/0217130 A1 | 9/2006 | Rowitch et al. |
| 2006/0229058 A1 | 10/2006 | Rosenberg |
| 2006/0246918 A1 | 11/2006 | Fok et al. |
| 2006/0293842 A1 | 12/2006 | Casino |
| 2007/0016643 A1 | 1/2007 | Boss et al. |
| 2007/0072553 A1 | 3/2007 | Barbera |
| 2007/0072616 A1 | 3/2007 | Irani |
| 2007/0082678 A1 | 4/2007 | Himmelstein |
| 2007/0287474 A1 | 12/2007 | Jenkins et al. |
| 2008/0061988 A1 | 3/2008 | Mock et al. |
| 2011/0009107 A1 | 1/2011 | Guba et al. |
| 2011/0021234 A1 | 1/2011 | Tibbitts et al. |
| 2012/0244883 A1 | 9/2012 | Tibbitts et al. |

FOREIGN PATENT DOCUMENTS

| | | |
|---|---|---|
| WO | WO 2006/070253 A2 | 7/2006 |
| WO | WO 2008/109477 A1 | 9/2008 |

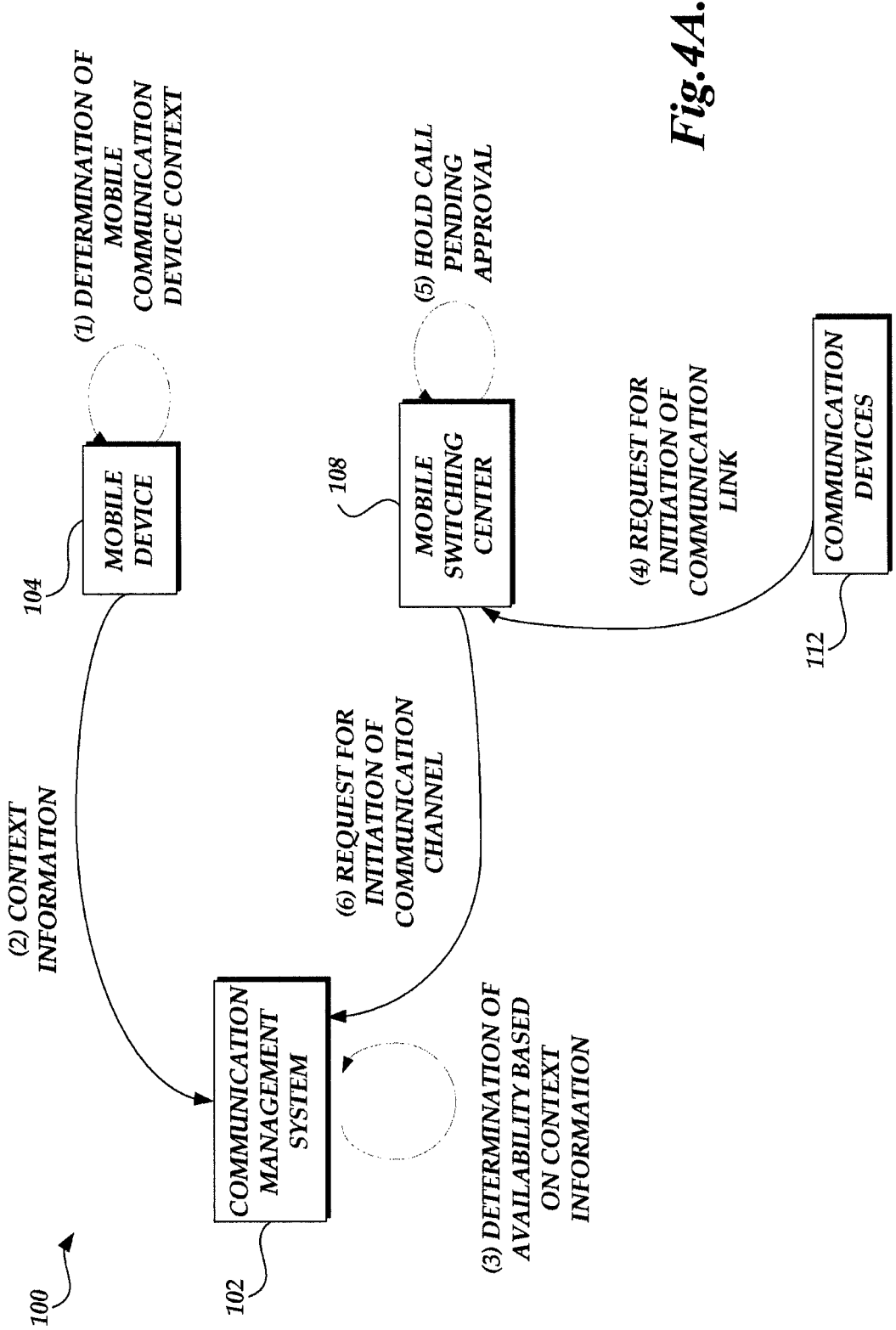

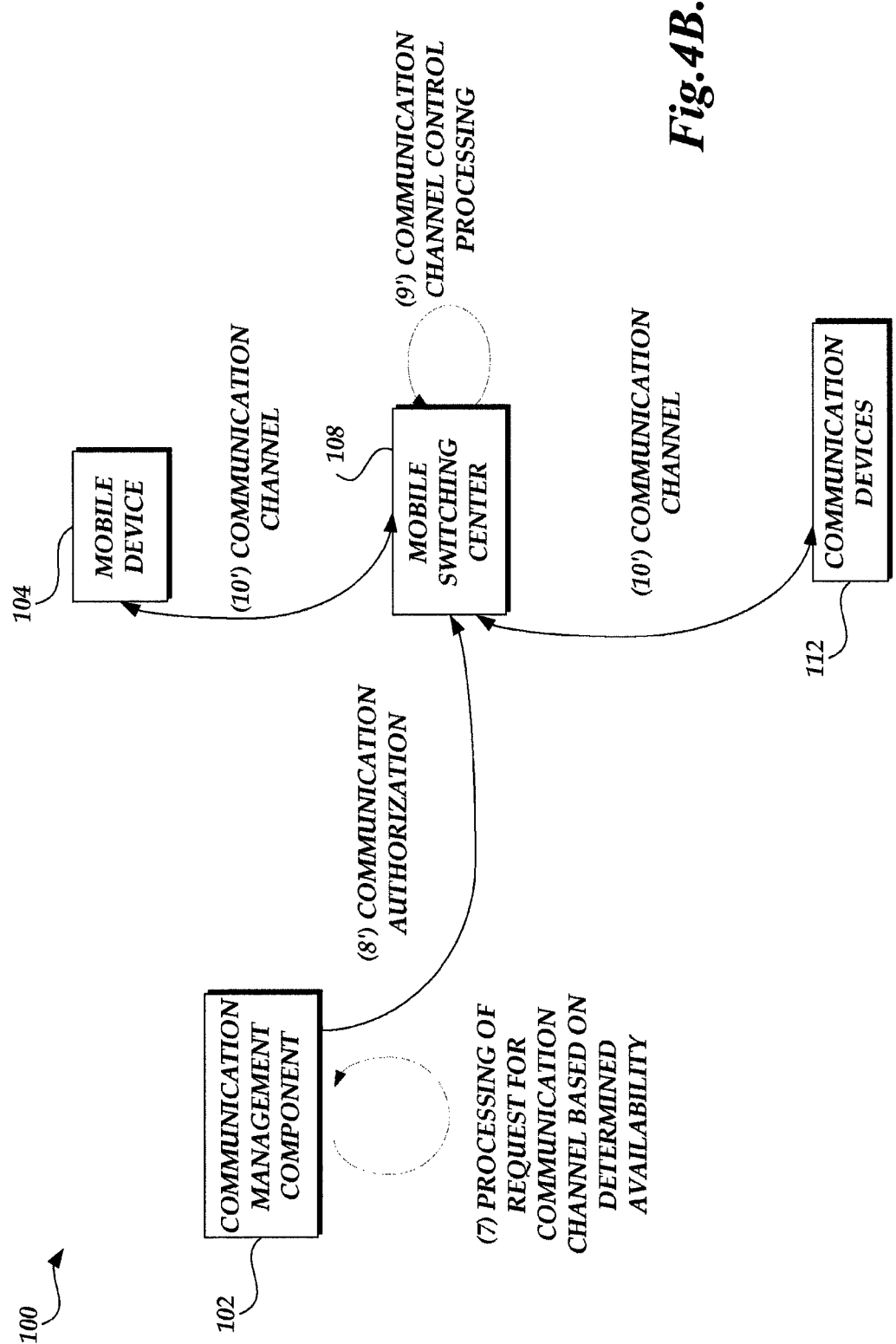

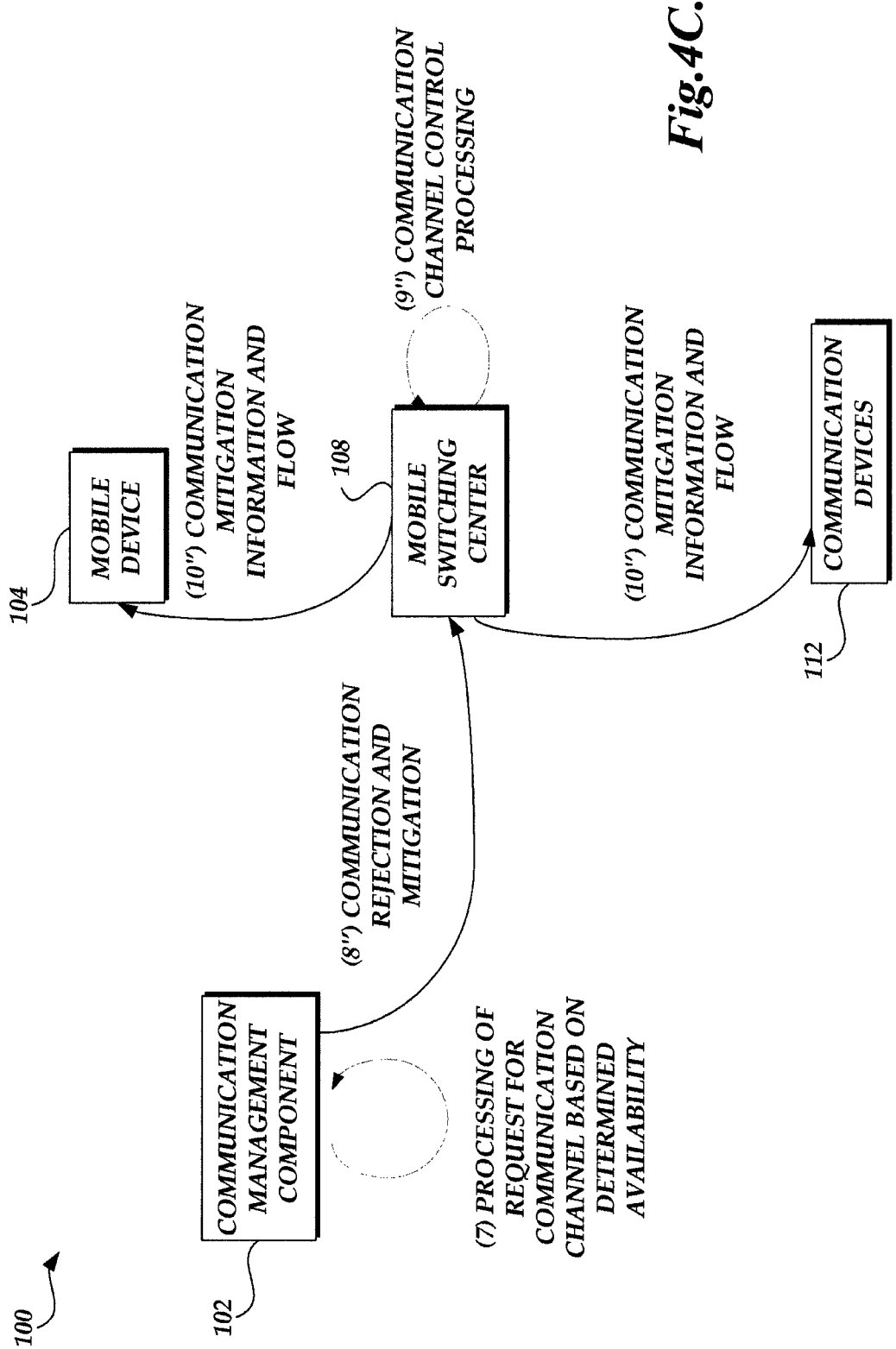

MONITORING MOBILE DEVICE CONTEXT

CROSS-REFERENCE TO RELATED APPLICATIONS

This application is a continuation of U.S. patent application Ser. No. 13/175,793, entitled SYSTEM AND METHODS FOR MONITORING THE CONTEXT ASSOCIATED WITH A MOBILE COMMUNICATION DEVICE, and filed Jul. 1, 2011, which will issue as U.S. Pat. No. 8,385,901; which is a continuation of U.S. patent application Ser. No. 12/040,842, entitled SYSTEM AND METHODS FOR MONITORING THE CONTEXT ASSOCIATED WITH A MOBILE COMMUNICATION DEVICE, and filed Feb. 29, 2008, now U.S. Pat. No. 8,000,689, which claims the benefit of U.S. Provisional Patent Application No. 60/892,628, entitled ENHANCED CELLULAR MOBILITY CALL AND SESSION MANAGEMENT, filed Mar. 2, 2007, the entirety of which are incorporated herein by reference.

BACKGROUND

1. Technical Field

The disclosure relates generally to mobile communication devices and communication management systems and to systems, methods and interfaces for management of mobile communication devices utilizing communication profiles and mobile communication device contexts.

2. Description of the Related Art

Generally described, mobile communication devices, such as mobile phones, facilitate audio and data communications for users. In one aspect, users can utilize a mobile communication device for audio and data communication without reference to the particular environment in which they are attempting to utilize the mobile communication device. For example, a stationary user can utilize a mobile phone in an area in which use of the phone does not necessarily pose a safety issue to the user or other individuals in the nearby area. In another aspect, however, the particular environment surrounding the user and/or use of the mobile communication device in the particular environment can impact the use of the mobile communication device, the safety of the specific users, and/or the safety of other individuals.

By way of example, driver distraction can be responsible for a large and growing number of road traffic accidents. One increasing cause of driver distraction is the operation of a mobile communication device while driving, such as for the purposes of audio conversation. As applied to driving (and other activities), the distraction associated with operation of a mobile communication device can be characterized in terms of the mechanical operation of the device (e.g., dialing numbers on a keypad to initiate a call) and/or the cognitive load of the subsequent communication session (voice communications and/or operation of the device). Additionally, the continued evolution of mobile communication devices into multifunctional components, such as for text messaging, image and video capture, handheld gaming, etc., will only continue to increase the potential for operator distraction and/or additional cognitive load on users during operation of the mobile communication device.

One approach to limit the operation of mobile communication devices relates to the utilization of control algorithms in vehicles to limit the use of cellular phones or cellular components. In an illustrative embodiment, a control algorithm can allow or deny communication based on monitoring various environmental sensors, such as the placement of a parking brake, the detection of a vehicle in gear, vehicle velocity and/or a distance traveled. This approach, however, can be inefficient in that the sensor information, such as vehicle velocity and/or distance traveled by itself, is not necessarily indicative of the appropriateness of use of a mobile communication device. For example, urban or city driving conditions in which there is heavy traffic can oftentimes result in low traveled distance and/or low velocities with frequent stops. Under a pure measured velocity approach, the mobile device may be allowed to operate if the vehicle is stopped, although use of a mobile communication device for such city driving conditions may not be preferable. Thus, the traditional velocity/distance approaches may be inefficient in distinguishing urban driving conditions from a person in a parked car by measuring velocity and/or distance traveled.

Another approach to limit the operation of mobile communication devices relates to the utilization of control algorithms that utilize third party information sources, such as software calendaring programs, to determine an availability of a user to receive communications. In an illustrative embodiment, a control algorithm can intercept, or otherwise, receive, a request from a third party to initiate an audio communication with a mobile communication device. The control algorithm can then poll the mobile communication device and/or additional third party information sources to determine the availability for establishing the audio communication. For example, if the control algorithms polls a third party calendaring software application and determines that the user associated with the mobile communication devices is at an appointment, the control algorithm may prevent the audio communication from being established. These approaches, however, can become inefficient by increasing communication initiation latencies by requiring a synchronous polling of the mobile communication device for availability. Additionally, these approaches generally do not facilitate management of outgoing communications by a user of a mobile device and/or the continued management of the mobile communication device once a communication channel has been established.

SUMMARY

Systems, methods and interfaces for managing communications associated with a mobile communication device are provided. In one embodiment, mobile communication devices process environmental inputs and utilize context assessment algorithms that process environment inputs from a variety of sensors and/or information sources into mobile device context information. Examples of the context assessment algorithms include various travel state context assessment algorithms, various geospatial (or geofence) location context assessment algorithms, and the like. In at least some cases, the context assessments reflect a degree of user risk associated with using the mobile communication device to engage in an interactive communication session, such as a voice call or a text messaging session.

As appropriate, the mobile communication device transmits the processed context information to a communication management system. For example, the mobile communication device may transmit context information upon a change from a previously determined context. Additionally, the mobile communication device can continue to transmit updated context information or changes in context information to the communication management system while a user communication session is in progress.

The communication management system uses the received context information, preferably in combination with profiles associated with particular mobile devices and users, to make decisions regarding how to manage communication session requests and/or ongoing communication sessions. For example, in one embodiment, the communication management system determines how to route or otherwise process an incoming call to a mobile communication device using context information already received from the mobile device, without having to poll the mobile device for its context; thus, the incoming call can be processed rapidly. Information regarding the identity of the caller and/or the electronic calendar of the callee may also be considered. If the communication management system determines that the mobile communication device is not available to establish a requested communication channel/session, the communication management system can provide communication channel mitigation options such as interaction with voicemail components, interactive voice response components, and the like.

In some embodiments, the communication management system can facilitate the provisioning and management of at least some of the aspects of the mobile communication device profile information through the presentation of various graphical user interfaces generated over a communication network, such as the Internet, and/or from user interaction via the mobile communication device.

Neither the foregoing summary nor the following detailed description purports to define the invention. The invention is defined by the claims.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-4C are block diagrams of the communication management system of FIG. 1 illustrating the transmission of mobile communication device context information by a mobile device and the processing by the communication management system of communication channel initiation requests submitted by a third party communication device;

DETAILED DESCRIPTION OF ILLUSTRATIVE EMBODIMENTS

Figure 1:
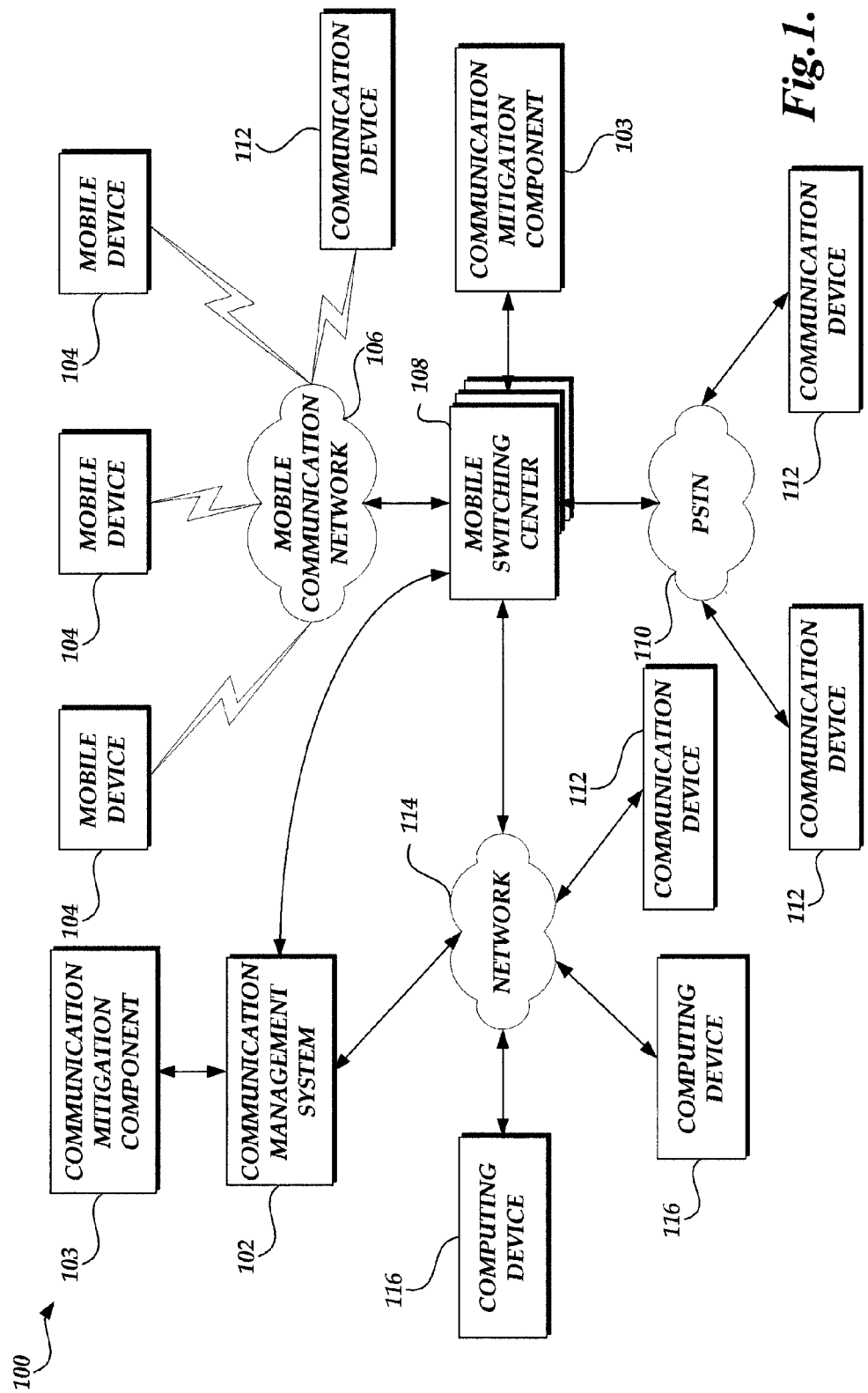
FIG. 1 is a block diagram illustrative of one embodiment of a communication management environment including a communication management system and a number of mobile communication devices.

The description in this specification is dedicated to the memory of Joe Teater.

A system will now be described that embodies various inventive features related to the management of communications with a mobile communications device. As will be recognized, many of these features can be used independently of others, and represent distinct inventions. Further, many of the features can be implemented differently than described herein. Thus, nothing in this detailed description implies that any particular feature, component, process step, characteristic, of combination of the foregoing is essential.

Generally described, embodiments of the present invention correspond to systems, methods and interfaces for the management of communications with a mobile communication device. Specifically, aspects of the present invention relate to the management of communications through the utilization of mobile communication device profiles, mobile communication device context information, and/or caller identification information to manage communications.

The mobile communication devices continuously collect, or otherwise obtain, various inputs corresponding to a mobile communication device environment. The mobile communication device processes some or all of the inputs with a context assessment algorithm to generate mobile communication device context information. The mobile communication device transmits the context information to a communication management system through a variety of communication methods/channels. The mobile communication device can limit the transmission of context information to the communication management system such that context information is transmitted upon determination of a change in a previous mobile communication device context. Additionally, the mobile communication device continues to transmit updated context information or updates to context information throughout various modes of operation, including during an established communication.

The communication management system utilizes the mobile communication device context information to determine communication device availability by processing the context information with a mobile communication device profile. The mobile communication device profiles can specify what communication channels are available for particular mobile communication device contexts. Additionally, the mobile communication device profiles can be a function of identification information, such as caller ID. Still further, the communication device profiles can specify communication channel mitigation options that can include a suggestion of alternative communication channels or other messages, the presenting of interactive response systems, and/or the initiation of actions in the event the mobile communication device is not available to maintain a requested communication channel or an existing communication channel.

For subsequent communication requests initiated by the user of the mobile communication device and/or a third party, the communication management system processes the request according to the prior determined communication availability selected as a function of appropriate selection information, such as the caller ID of the third party. Additionally, in the event of a change of a mobile communication device context during a previously established communication channel that changes communication availability, the communication management system can implement specified communication channel mitigation actions, which can include the modification or termination of the existing communication channel.

Although aspects of the system will be described to the drawings, flow diagrams, screen interfaces, and specific examples, one skilled in the relevant art will appreciate that the disclosed embodiments are illustrative in nature. Accordingly, the disclosed embodiments should not be construed as limiting.

Communication Management Environment

With reference now to FIG. 1, a block diagram illustrative of a communication management environment 100 for managing mobile communication device communications will be described. As illustrated in FIG. 1, the communication management environment 100 includes a communication management system 102 for processing requests for establishing a communication channel between a supported mobile device and a third party communication device. The communication management system 102 maintains mobile communication device profiles that are provisioned to establish the availability for the mobile communication device to establish a communication channel as a function of mobile communication device context information. The communication device profiles may also be provisioned as a function of identification information of an applicable third party. As will also be described in greater detail below, the communication management system 102 determines the availability of the mobile device to establish a communication channel asynchronously to any request to establish a communication channel.

To manage requested communications or previously established communication channels, the communication management system 102 communicates with corresponding subsystems responsible for establishing the wireless communication channel, such as mobile switching center 108, and utilizes the predetermined availability information and appropriate identification information to allow/reject communications. The communication management system 102 can communicate with the mobile switching center 108 via a direct communication connection, a secure communication channel via a communication network, such as communication network 114, or via a public communication network.

Additionally, the communication management system 102 provides communication channel mitigation options in the event that the mobile communication device is unavailable, which can include interfacing with a communication mitigation components 103, such as a voice mail system or an interactive voice response system. Still further, the communication management system 102 facilitates the generation of various graphical user interfaces for provisioning and/or managing mobile communication device profiles via computing devices 116. Illustrative components of the mobile communication management system will be described in greater detail with regard to FIG. 2.

With continued reference to FIG. 1, the communication management environment 100 can include a number of mobile communication devices 104. The mobile communication devices 104 can correspond to wide variety of devices or components that are capable of initiating, receiving or facilitating communications over a communication network including, but not limited to, personal computing devices, hand-held computing devices, integrated components for inclusion in computing devices, home electronics, appliances, vehicles, and/or machinery, mobile telephones, modems, personal digital assistants, laptop computers, gaming devices, and the like. In an illustrative embodiment, the mobile communication devices 104 include a wide variety of software and hardware components for establishing communications over one or more communication networks, including wireless or wired mobile communication networks 106. The mobile communication devices 104 can be associated with one or more users for managing communication channel requests and existing communication channels according mobile communication device contexts. Illustrative components of a mobile communication device will be described in greater detail with regard to FIG. 3.

With continuing reference to FIG. 1, an illustrative communication management environment 100 can include a number of additional components, systems and/or subsystems for facilitating communications with the mobile communication devices 104 and/or the communication management system 102. The additional components can include one or more mobile switching centers 108 for establishing communications with the mobile communication devices 104 via the mobile communication network 106, such as a cellular radio access network, a wireless network based on the family of IEEE 802.11 technical standards ("WiFi"), a wireless network based on IEEE 802.16 standards ("WiMax), and other wireless networks. The operation of mobile communication networks, such as mobile communication network 106 are well known and will not be described in greater detail.

As illustrated in FIG. 1, the mobile switch center 108 includes interfaces for establishing various communications with via the communication network 114, such as the Internet, intranets, private networks and point-to-point networks. In one example, the mobile switch center 108 can include interfaces for establishing communication channels with various communication devices 112, such as landline telephones, via a public switched telephone network (PSTN) 110. The mobile switch center 108 can include interfaces for establishing communication channels with various communication network-based communication devices 112, such as a VoIP communication device. Still further, the mobile switch center 108 can include interfaces for establishing communication channels with a mobile-based communication device 112, such as another mobile communication device. For example, the communication devices 112 can correspond to a third-party mobile communication that establishes an audio communication channel with a mobile communication device 104. Accordingly, although communication network 114 is illustrated as a single communication network, one skilled in the relevant art will appreciate that the communication network can be made up of any number of public or private communication networks and/or network connections.

The various communication devices 112 can include the hardware and software components that facilitate the various modes of operation and communication, such as via wired and wireless communication networks. Additionally, the computing devices 116 can include various hardware and software components, such as a browser software application, that facilitate the generation of the graphical user interfaces for provisioning and managing mobile communication device profiles as will be described below.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

Figure 2:
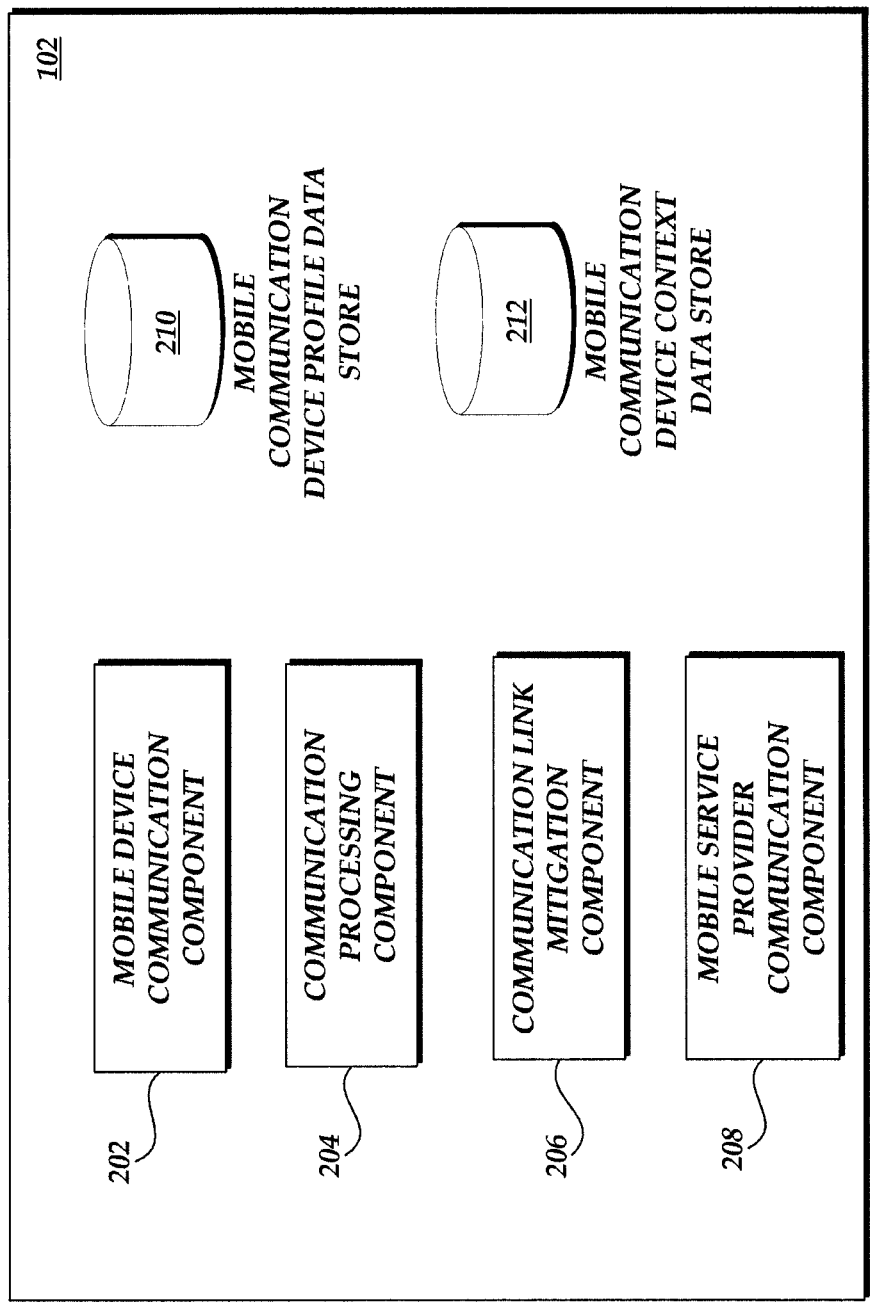
FIG. 2 is a block diagram illustrative of aspects of the communication management system of FIG. 1 in an embodiment of the communication management environment.

With reference now to FIG. 2, illustrative components for the communication management system 102 will be described. Although the operation of the various functions associated with the communication management system 102 will be described with regard to below subcomponents, one skilled in the relevant art will appreciate that the subcomponents are illustrative in nature. Accordingly, a communication management system 102 may include additional components or alternative components to facilitate one or more functions. Additionally, although the various subcomponents are illustrated as integrated into a communication management system 102, one or more of the components may be implemented in a distributed manner over a communication network and/or be implemented as a network service, e.g., a Web service.

As illustrated in FIG. 2, the communication management system 102 includes a mobile device communication component 202 for establishing communications with a mobile communication device 104. In an illustrative embodiment, the mobile device communication component 202 corresponds to a component for facilitating the bi-lateral transfer of data, such as mobile device context information, context assessment algorithms, etc., between the mobile communication device 104 and the communication management system 102. The mobile device communication component 202 can include software and hardware components necessary to establish one or more communication channels corresponding to various communication protocols such as Bluetooth, the family of IEEE 802.11 technical standards ("WiFi"), the IEEE 802.16 standards ("WiMax), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA and similar technologies).

The communication management system 102 can also include a communication processing component 204 for determining the availability of a mobile communication device 104 for communication channels based on processing mobile communication device context information according to a mobile communication device profile. The communication processing component 204 can execute various processes or algorithms for processing transmitted mobile communication device context information to determine mobile communication device availability. Additionally, the communication processing component 204 can also manage the various context assessment processes or algorithms and updates to existing previously stored context assessment processes and algorithms that are transmitted and executed by the mobile communication devices 104. Still further, the communication processing component 204 processes requests for communications between the mobile communication device 104 and third parties based on the predetermined availability information and identification information (e.g., the caller ID of a specific third party caller).

With continued reference to FIG. 2, the communication management system 102 can include a communication mitigation component 206 for processing alternative communication options if a requested communication channel is unavailable or if an existing communication is to be terminated due to a change in mobile communication device context. As previously discussed, the communication mitigation component 206 can interface with existing communication components, or subsystems, such as mitigation components 103 for providing user voicemail functionality or accessing existing voicemail services hosted by the mobile switching center 108. Additionally, the communication mitigation component 206 can provide additional data and/or instructions for establishing alternative communication channels between the mobile device and a third party communication device 112, such as providing interactive voice response functionality, as will be explained in greater detail below. Still further, the communication management system 102 can include a mobile service provider communication component 208 for processing requests for establishing communications, which includes indicating to a mobile switching center 108 whether to allow a requested communication channel to be established and/or indicating whether to terminate an existing communication channel.

The communication management system 102 can further include a mobile communication device profile data store 210 for maintaining mobile communication device profiles. The mobile communication device profile data store 210 may be one or more databases configured to provide the communication processing component 204 required data to determine mobile communication device availability according to mobile communication device context. As will be described in greater detail below, the mobile communication device profile data defines the availability of the mobile communication device 104 as a function of a current mobile communication device context. A mobile communication device profile can be defined such that the determined mobile communication device applicability will be applicable to all third party users, groups of users or specific users. For example, profiles can be associated with a telephone number such that the communication manage system 102 can select an appropriate profile (and its predetermined availability) based on identification information associated with a communication request, such as caller identity information. Accordingly, the mobile communication device profile information in the communication device profile data store 210 can be stored in a manner that facilitates that faster retrieval according to identification information, as will be described in greater detail below.

With continued reference to FIG. 2, the communication management system 102 can also include a mobile communication device context data store 212 for maintaining mobile communication device context information previously transmitted by the mobile communication devices 104 and/or for maintaining the mobile communication device context assessment algorithms utilized by the mobile communication devices to process inputs into mobile communication device context. In one embodiment, the mobile communication device context information may be accessible, or otherwise published, to other computing devices, network based services, or users via the communication network 114.

Figure 3:
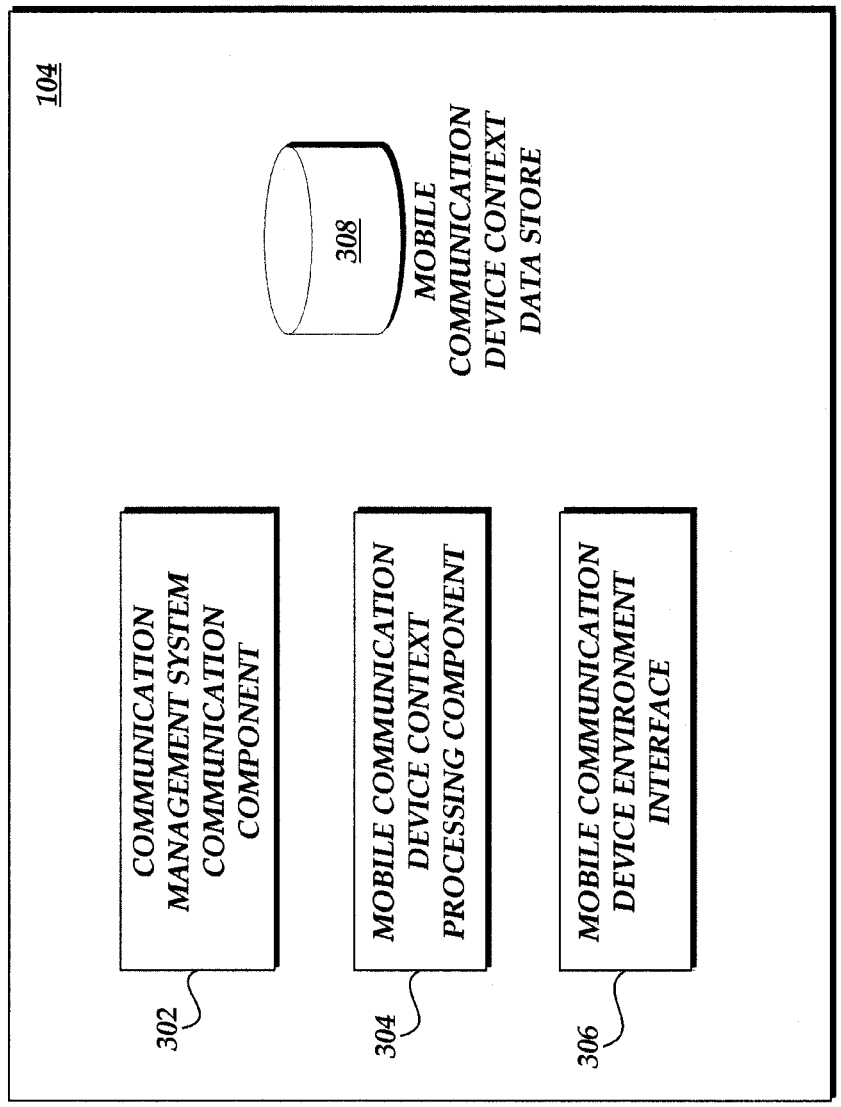
FIG. 3 is a block diagram illustrative of aspects of the mobile communication device of FIG. 1 in an embodiment of the communication management environment.

With reference now to FIG. 3, illustrative components for the mobile communication device 104 will be described. Although the operation of the various functions associated with the mobile device 104 will be described with regard to below components, one skilled in the relevant art will appreciate that the components are illustrative in nature. Accordingly, a mobile device 104 may include additional components or alternative components to facilitate one or more functions. Additionally, although the various subcomponents are illustrated as integrated into a mobile device 104, one or more of the components may be implemented in a distributed matter over a communication network and/or be implemented as a network service, e.g., a Web service.

As illustrated in FIG. 3, the mobile device 104 includes a communication management system communication component 302 for facilitating communications with the communication management system 102. As described above with regard to the mobile device communication component 202 (FIG. 2), the communication management system communication component 302 facilitates the bi-lateral transfer of data between the mobile communication device 104 and the communication management system 102. One skilled in the relevant art will appreciate that the communication management system communication component 302 can include software and hardware components necessary to establish one or more communication channels corresponding to various communication protocols for establishing the bi-lateral communication channels. Moreover, although the communication management system communication component 302 is illustrated as a separate component, the functionality of the component may be integrated, or otherwise combined, with one or more hardware or software components utilized by the mobile communication device 104 to make communication channels (e.g., cellular communication channels or SMS communication channels as part of the designed function of the mobile device).

As will be described in greater detail below, the communication management system communication component 302 transmits current mobile device context information in accordance with the context assessment algorithms on the mobile device 104. Once a current mobile communication device context is established, the communication management system 302 can limit additional transmission of context information upon detection of a change in mobile communication context information. Additionally, in an alternative embodiment, the communication management system communication component 302 may also transmit, or otherwise publish, mobile communication device context information to additional recipients, such as communication network resources such as Web sites or network services, and/or to other peer destinations.

The mobile communication device 104 can also include a mobile communication device context information component 304 for processing a set of inputs corresponding to a mobile device environment to determine mobile device context information. Illustrative context assessment algorithms or processes for determining mobile device context information will be described in greater detail below. The mobile communication device contexts can identify or describe aspects of the mobile communication device 104, aspects of the mobile communication device environment, and/or aspects of the user associated with the mobile communication device. For example, the mobile communication device context corresponds to a determination of various states of movement/travel, such as in a non-transitory state, an in-transit state (including city/urban travel transit, highway transit, and in-flight transit states), a journey onset state, and a journey termination state. In another example, the mobile communication device context corresponds a determination of whether a mobile communication device's present location is within a geospatial boundary, also referred to as geofencing, (including within the geospatial boundary, on a border of the geospatial boundary, or outside the geospatial boundary). One skilled in the relevant art will appreciate that the identified mobile device contexts are not exhaustive and that any number of additional mobile device contexts, or variations of the identified mobile communication device contexts, may also be defined for the mobile communication device 104.

With continued reference to FIG. 3, the mobile communication device 104 can also include a mobile communication device environment interface 306 for obtaining inputs corresponding to a mobile communication device environment. In an illustrative embodiment, the set of inputs can include information from one or more sensors such as a global position sensor (GPS) component or other location identification components, accelerometers, altimeters, compasses, gyroscopes, microphones, scales or other weight detection mechanisms, range finders, proximity sensors, gas or radiation detectors, electric current or electric induction detection, digital image sensors, thermometers and the like. Additionally, the set of inputs can correspond to information obtained from communication network based resource such as calendaring information, identity or contact information and the like.

In one embodiment, the set of inputs include information from sensors or information gathering components that are integrated or attached to the mobile computing device 104. In another embodiment, the set of inputs include information from external sensors or information gather components that provide the information via a communication channel, such as a hardwired connection or wireless connection (e.g., Bluetooth). Still further, in another embodiment, the set of inputs include information related to sensors or processed information from another device or article of manufacture associated with the mobile communication device. For example, the set of inputs can include information from a vehicle computer indicating information about the operation/condition of the vehicle and/or environmental information. Additional information from seat sensors may be able to inform that the remote end user is indeed a passenger and not a driver, and further, that seat belts are engaged. Still further, in another embodiment, the set of inputs include information from sensors that can be repurposed, such as through additional processing, to determine mobile communication device context information. For example, image data from a camera sensor or signal data from a transceiver chipset may be utilized as inputs to a context assessment algorithm to determine mobile communication device context. The above provided identification of the specific types of sensors is not exhaustive. Accordingly, additional or alternative sensors may be utilized to provide information for determining mobile communication device context information.

One skilled in the relevant art will appreciate that the set of inputs may be selected to correspond specifically to the particular algorithms utilized to calculate mobile communication device context. In one example, microphonic sensors may used for detecting high noise levels from the embedded device microphone and using this context to permit only high importance work related calls and data session requests that pertain to the current work function. Furthermore, the mobile device context information can be utilized to inform the calling party that the callee is in a high noise environment and that a text message may be a more appropriate. In another example, the sensor information can corresponds to a determination whether a Bluetooth headset or alternative hands free device is active in accordance with a corporate policy and local jurisdiction law. In still a further example, radiation detector sensor information could be utilized to detect increases in radioactive levels. The context could be utilized to immediately instruct the call and data session management control to connect the mobile end users with an emergency response team and autonomously report existing location and radiation levels just in case the mobile end user is incapacitated by some external cause.

In still a further example, gas or substance detector sensors could be utilized to detect an increase in gas or substance levels. The context could be utilized to immediately instruct the call and data session management control to connect the mobile end users with an emergency response team and autonomously report existing location and gas and substance levels just in case the mobile end user is incapacitated by some external cause. In yet another example, utilization near field inductive techniques sensors could be utilized to detect the process of charging via near field inductive components. The context could be used such that a call and data session management entity should perhaps be reroute calls and data session requests to different devices.

In still another example, proximity sensor information could be used to determine a context that the user is currently interacting in a specific manner with the mobile end device may enable specific call and data session management decisions to be critically enabled. In a further example, image data from a mobile device camera may be utilized via signal context assessment algorithms to determine the user's environment. In another example, user configurable keys/control sensor data can be utilized to customize mobile device context information, such as using soft keys, to register specific contexts provided by the mobile communication device user (e.g., "watch me," "help," etc.).

The mobile communication device 104 can further include a mobile communication device data store 308 for storing input information from the mobile communication device environment interface 306, context information generated by the mobile communication device processing component 304 and/or the various context assessment algorithms or processes used by the mobile communication device processing component to generate the mobile communication device context information.

Figure 5:
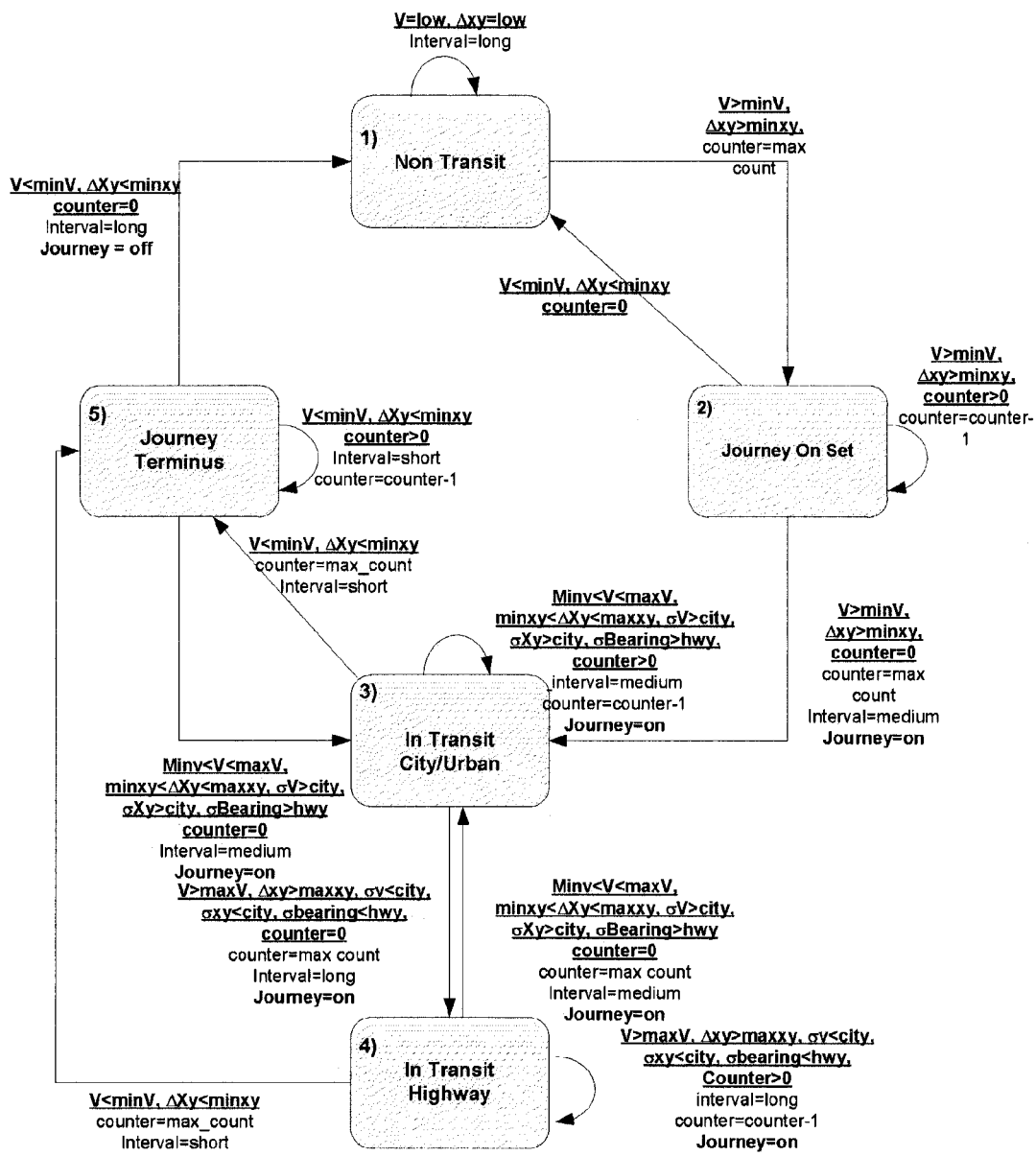
FIG. 5 is a block diagram of one embodiment of a travel state context assessment algorithm state machine implemented by a mobile communication device in providing mobile communication device context information to a communication management system.
Figure 6:
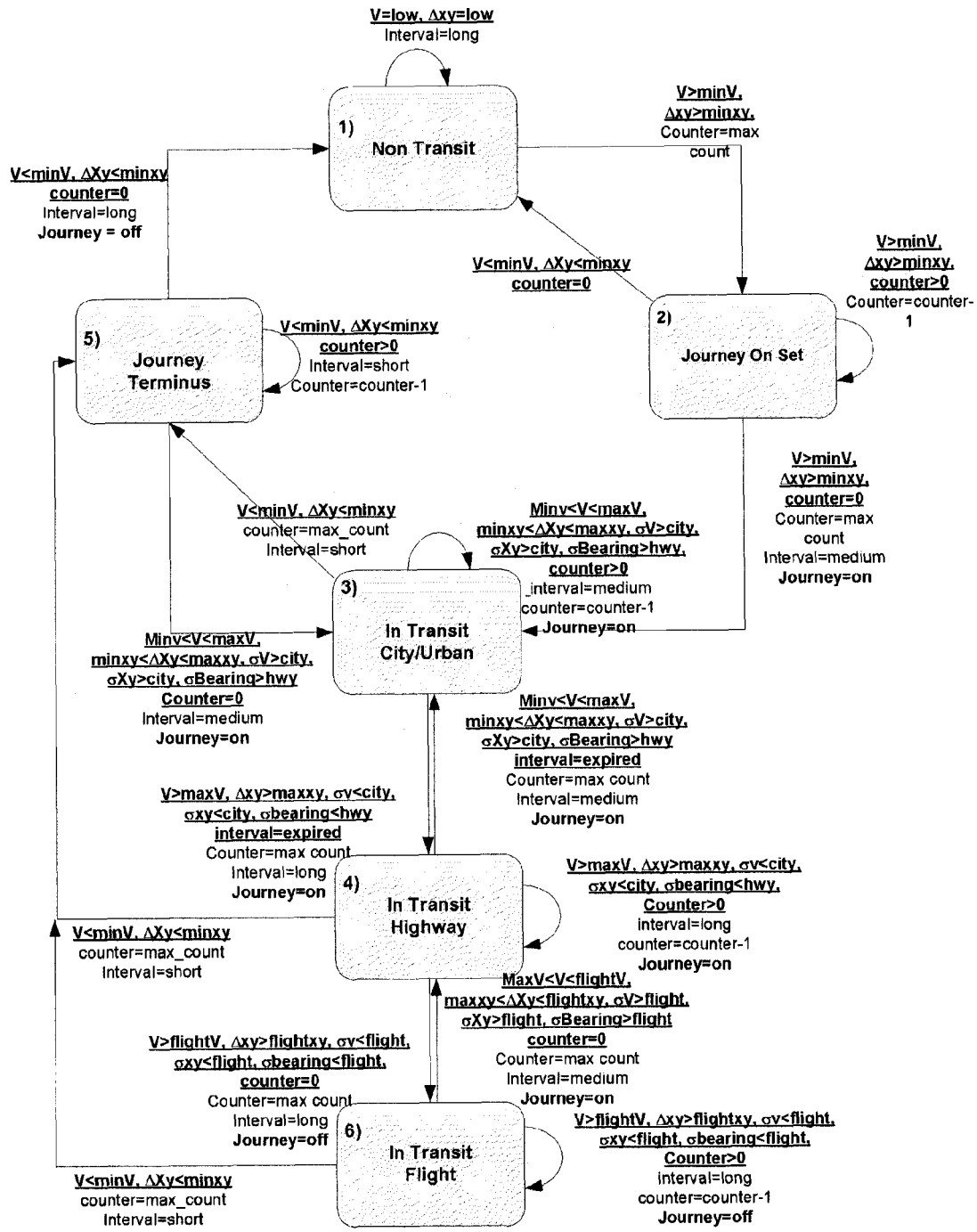
FIG. 6 is a block diagram of another embodiment of a travel state context assessment algorithm state machine implemented by a mobile communication device in providing mobile communication device context information to a communication management system.

With reference now to FIG. 4-6, the interaction between various components of the communication management environment 100 of FIG. 1 will be illustrated. For purposes of the example, however, the illustration has been simplified such that many of the systems, subsystems, and components utilized to facilitate communications are not shown. One skilled in the relevant art will appreciate that such components or subcomponents can be utilized and that additional interactions would accordingly occur without departing from the spirit and scope of the present invention.

With reference now to FIGS. 4A-4C, one embodiment related to the processing of a request from a third party communication device 112 to establish a communication channel, such as an audio call, will be described. For purposes of the illustrative example, a particular mobile computing device 104 has registered with a communication management service that provides the communication management system 102. Additionally, a user of the mobile device 104 has provisioned a mobile communication device profile that identifies the availability of the mobile communication device as a function of mobile communication device contexts and third party identification information. Alternatively, some portion the mobile communication device profile may be pre-provisioned for the user and/or automatically set by an administrator, such as a service provider.

As illustrated in FIG. 4A, during the operation of the mobile communication device 104, or during an initialization of the mobile communication device, the mobile communication device interface component 306 obtains a set of inputs corresponding to the mobile communication device environment. The set of inputs are processed by the mobile communication device context processing component 304 to generate mobile communication device context information. The communication management system communication component 302 than transmits the mobile communication device context information to the communication management system 102 as appropriate. Specifically, to reduce power consumption and/or bandwidth consumption, the communication management system communication component 302 may limit the transmission of mobile communication device context information for the initialization of a mobile communication device context, a detection of a change in mobile communication device context and/or for the re-establishment of a mobile communication device context.

Upon receipt of the context information, the mobile device communication component 202 transmits the context information to the communication processing component 204 for processing. The communication processing component 204 obtains a corresponding, or applicable, mobile communication device profiles from the mobile communication device profile data store 210. The communication processing component 204 may utilize one or more mobile communication device profiles to determine mobile communication device availability from the context information. Alternatively, a single mobile communication device profile may define availability for multiple mobile communication device contexts. The communication processing component 204 then determines the availability of the mobile communication device to establish a communication channel (either receipt of a request or the initiation of a request) based on the processing.

Thereafter, in the illustrative example of FIG. 4A, a communication device 112, such as a third party communication device 112 initiates a request to establish a communication channel with the mobile device 104. The request is received by the mobile switching center 108 and is held pending an approval or rejection by the communication management system 102. The applicable mobile switching center 108 then transmits the request to the mobile service provider communication component 208 to request a determination whether the requested communication channel should be established. The request can include additional information utilized by the communication management component 102 to select an appropriate profile, including caller identification information and the like.

With reference now to FIG. 4B, upon receipt of the request or notification from the mobile switching center 108, the communication processing component utilizes the predetermined availability of the mobile communication device 104 to authorize or reject the establishment of the requested communication channel. If the request to initiate the communication channel is authorized, the authorization is transmitted to the mobile switching center 108, which processes the request for initiation of the communication channel in an appropriate manner. Accordingly, the requested communication channel is completed. As will be described in greater detail below with regard to FIG. 15, the communication management system 102 may continue to monitor the established communication channel for a change in mobile communication device context and will manage the communication channel as defined in the applicable mobile communication device profile.

With reference now to FIG. 4C, alternatively, if the request for initiation of the communication channel is rejected based on a predetermined unavailability of the mobile communication device 104, the communication management component 102 transmits a rejection authorization communication to the mobile switching center 108 to prevent the initiation of the communication channel. Additionally, the communication mitigation component 206 can provide appropriate communication mitigation, such as notifications to the users of the mobile communication device 104 and the communication device 112. Additionally, the communication management component 102 can obtain a selection of a communication channel alternative defined in the mobile communication device profile, such as voicemail systems or interactive voice response systems, as will be described in greater detail below.

With reference now to FIGS. 5-9, state diagrams of illustrative context assessment algorithms will be presented. One skilled in the relevant art will appreciate that although specific states, variables, and thresholds are presented in FIGS. 5-9, the disclosure is not limited to the application of the illustrative context assessment algorithms. Additionally, the illustrative context assessment algorithms may also be applied with variations to the identified parameters. Accordingly, the illustrative context assessment algorithms should not be construed as limiting.

FIG. 5 is a block diagram of one embodiment of a travel state context assessment algorithm state machine implemented by a mobile communication device 104 in providing mobile communication device context information to a communication management system 102. As will be explained in greater detail below with regard to FIG. 12, the algorithm may use one or more of the following parameters to determine mobile communication device 104 travel state context information, where the parameters, and thresholds identified in FIG. 5 are represented by:

Motion Parameters

| | |
|---|---|
| ΔXY | distance traveled over time interval |
| Velocity | current instantaneous velocity |
| Δlat-long | proxy for distance traveled over time interval |
| σvel | variation in velocity over the last N observation |
| σxy | variation in displacement over the last Nvar observations |
| Bearing | bearing |
| σbearing | variation in bearing over the last Nvar observations |

Thresholds

| | |
|---|---|
| Min Δxy | minimum distance to be traveled in an interval |
| Min V | minimum velocity threshold |
| Max V | maximum velocity threshold |
| Min Δxy-city | minimum distance to be traveled in an interval for city/urban driving |
| Min Δxy-highway | minimum distance to be traveled in an interval for highway driving |
| Vcity | minimum velocity threshold for city/urban driving |
| Vhighway | minimum velocity threshold for highway driving |
| σxy-city | city/urban driving displacement variance threshold |
| σxy-Hwy | highway driving displacement variance threshold |
| σxy-flight | aircraft flight displacement variance threshold |
| σV-city | city/urban driving velocity variance threshold |
| σV-Hwy | highway driving velocity variance threshold |
| σbearing-city | city/urban driving bearing variance threshold |
| σbearing-hwy | highway driving bearing variance threshold |

Intervals & Counters

| | |
|---|---|
| Long | typically 64 to 32 seconds, configurable, default = 48 |
| Medium | typically 8 to 32 seconds, configurable, default = 24 |
| Short | typically 8 to 2 seconds, configurable, default = 8 |
| Counter | number of observations counter |
| MCount | Max count typically 4-12, default 8 |
| Nvar | number of observations required to compute variance |

FIG. 6 is a block diagram of another embodiment of a travel state context assessment algorithm state machine implemented by a mobile communication device 104 in providing mobile communication device context information to a communication management system 102. As will be explained in greater detail below with regard to FIG. 12, the algorithm may use one or more of the following parameters to determine mobile communication device 104 travel state context information, where the parameters, and thresholds identified in FIG. 6 are represented by:

Motion Parameters

| | |
|---|---|
| ΔXY | distance traveled over time interval |
| Velocity | current instantaneous velocity |
| Δlat-long | proxy for distance traveled over time interval |
| σvel | variation in velocity over the last N observation |
| σxy | variation in displacement over the last Nvar observations |
| Bearing | bearing |
| σbearing | variation in bearing over the last Nvar observations |

Thresholds

| | |
|---|---|
| Min Δxy | minimum distance to be traveled in an interval |
| Min V | minimum velocity threshold |
| Max V | maximum velocity threshold |
| Min Δxy-city | minimum distance to be traveled in an interval for city/urban driving |

-continued

| | |
|---|---|
| Min Δxy-highway | minimum distance to be traveled in an interval for highway driving |
| Min Δxy-flight | minimum distance to be traveled in an interval for aircraft flight |
| Vcity | minimum velocity threshold for city/urban driving |
| Vhighway | minimum velocity threshold for highway driving |
| Vflight | minimum velocity threshold for aircraft flight |
| σxy-city | city/urban driving displacement variance threshold |
| σxy-Hwy | highway driving displacement variance threshold |
| σxy-flight | aircraft flight displacement variance threshold |
| σV-city | city/urban driving velocity variance threshold |
| σV-Hwy | highway driving velocity variance threshold |
| σV-flight | aircraft in-flight velocity variance threshold |
| σbearing-city | city/urban driving bearing variance threshold |
| σbearing-hwy | highway driving bearing variance threshold |
| σbearing-flight | in-flight bearing variance threshold |

Intervals & Counters

| | |
|---|---|
| Long | typically 64 to 32 seconds, configurable, default = 48 |
| Medium | typically 8 to 32 seconds, configurable, default = 24 |
| Short | typically 8 to 2 seconds, configurable, default = 8 |
| Counter | number of observations counter |
| MCount | Max count typically 4-12, default 8 |
| Nvar | number of observations required to compute variance |

Figure 7:
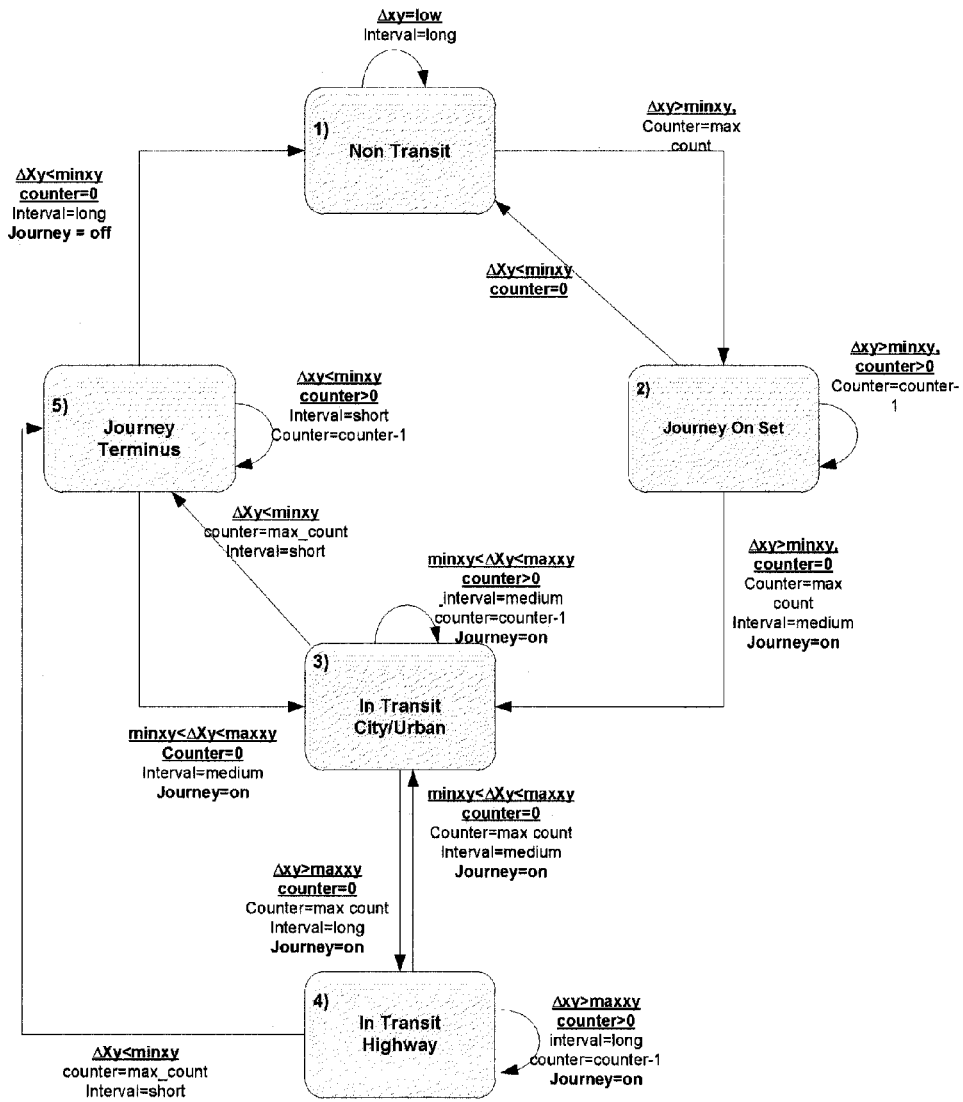
FIG. 7 is a block diagram of another embodiment of a travel state context assessment algorithm state machine implemented by a mobile communication device in providing mobile communication device context information to a communication management system.

FIG. 7 is a block diagram of yet another embodiment of a travel state context assessment algorithm state machine implemented by a mobile communication device 104 in providing mobile communication device context information to a communication management system 102. As will be explained in greater detail below with regard to FIG. 12, the algorithm may use one or more of the following parameters to determine mobile communication device 104 travel state context information, where the parameters, and thresholds identified in FIG. 7 are represented by:

Motion Parameters

| | |
|---|---|
| ΔXY | distance traveled over time interval |

Thresholds

| | |
|---|---|
| Min Δxy | minimum distance to be traveled in an interval |
| Min Δxy-city | minimum distance to be traveled in an interval for city/urban driving |
| Min Δxy-highway | minimum distance to be traveled in an interval for highway driving |
| Min Δxy-flight | minimum distance to be traveled in an interval for aircraft flight |

Intervals & Counters

| | |
|---|---|
| Long | typically 64 to 32 seconds, configurable, default = 48 |
| Medium | typically 8 to 32 seconds, configurable, default = 24 |
| Short | typically 8 to 2 seconds, configurable, default = 8 |
| Counter | number of observations counter |
| MCount | Max count typically 4-12, default = 8 |

Figure 8:
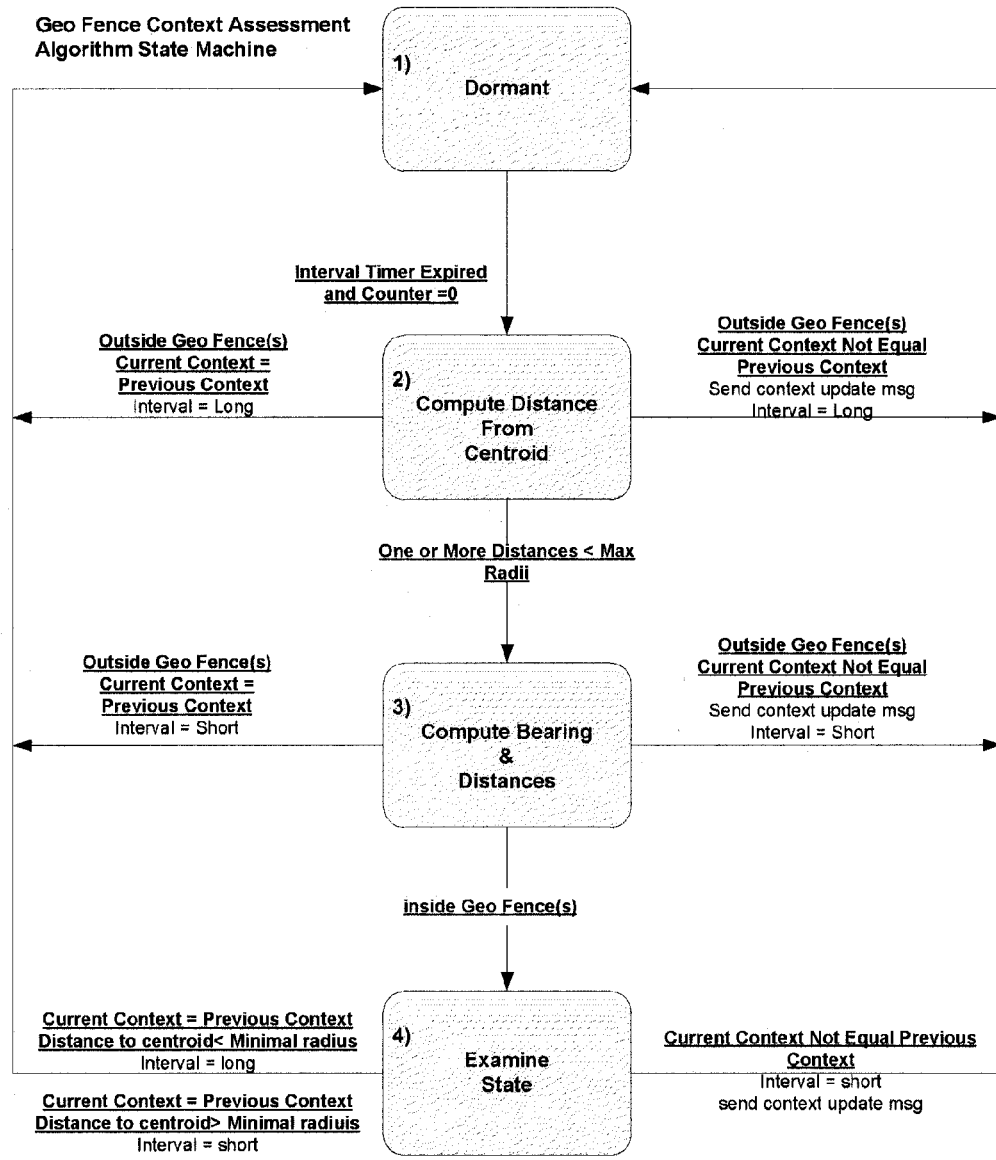
FIG. 8 is a block diagram of one embodiment of a geospatial context assessment algorithm state machine implemented by a mobile communication device in providing mobile communication context information to a communication management system.

FIG. 8 is a block diagram of one embodiment of a geospatial context assessment algorithm state machine implemented by a mobile communication device 102 in providing mobile communication context information to a communication management system 102. As will be explained in greater detail below with regard to FIG. 14, the algorithm may use one or more of the following parameters to determine mobile communication device 104 geospatial context information, where the parameters, and thresholds identified in FIG. 8 are represented by:

Geo-Spatial Parameters

| | |
|---|---|
| ΔXYc | distance between geo-fence centroid and current location |
| Bearing | Bearing between geo-fence centroid and current location |
| Bearing List | List of bearings and displacements that define a geo-spatial region, a geo-fence. |

Thresholds

| | |
|---|---|
| Max radius | minimum distance to be traveled in an interval |
| Min radius | minimum velocity threshold |
| Min-ΔXY | minimum displacement between location observations |

Intervals & Counters

| | |
|---|---|
| Long | typically 64 to 32 seconds, configurable, default = 48 |
| Medium | typically 8 to 32 seconds, configurable, default = 24 |
| Short | typically 8 to 2 seconds, configurable, default = 8 |
| Interval counter | duration counter in seconds between observations |

Figure 9:
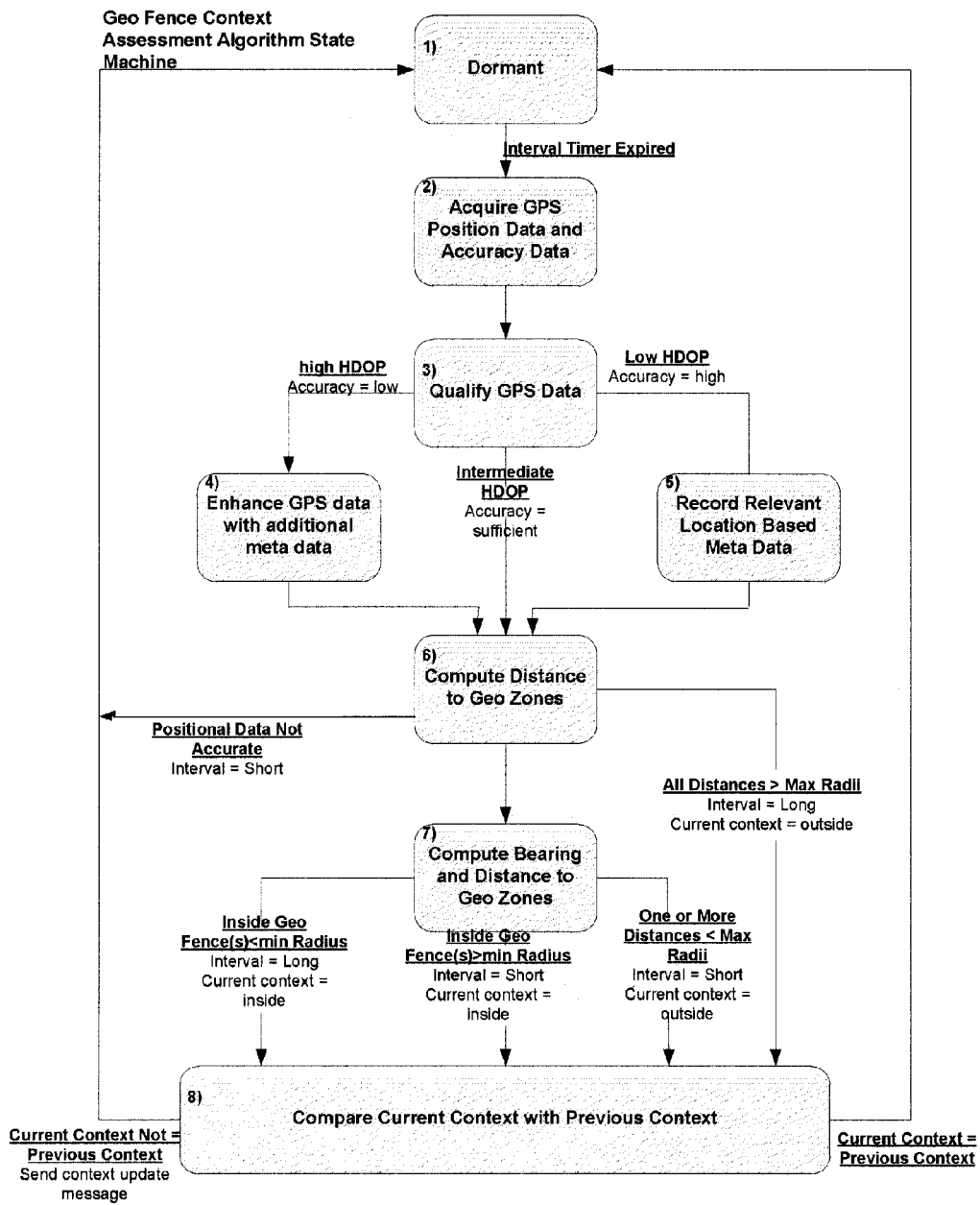
FIG. 9 is a block diagram of another embodiment of a geospatial context assessment algorithm state machine implemented by a mobile communication device in providing mobile communication context information to a communication management system.

FIG. 9 is a block diagram of another embodiment of a geospatial context assessment algorithm state machine implemented by a mobile communication device 102 in providing mobile communication context information to a communication management system 102. As will be explained in greater detail below with regard to FIG. 14, the algorithm may use one or more of the following parameters to determine mobile communication device 104 geospatial context information, where the parameters, and thresholds identified in FIG. 8 are represented by:

Geo-Spatial Parameters

| | |
|---|---|
| ΔXYc | distance between geo-fence centroid and current location |
| Bearing | Bearing between geo-fence centroid and current location |
| Bearing List | List of bearings and displacements that define a geo-spatial region, a geo-fence. |

Thresholds

| | |
|---|---|
| Max radius | minimum distance to be traveled in an interval |
| Min radius | minimum velocity threshold |
| Min-ΔXY | minimum displacement between location observations |

Intervals & Counters

| | |
|---|---|
| Long | typically 64 to 32 seconds, configurable, default = 48 |
| Medium | typically 8 to 32 seconds, configurable, default = 24 |
| Short | typically 8 to 2 seconds, configurable, default = 8 |
| Interval counter | duration counter in seconds between observations |

Figure 10A:
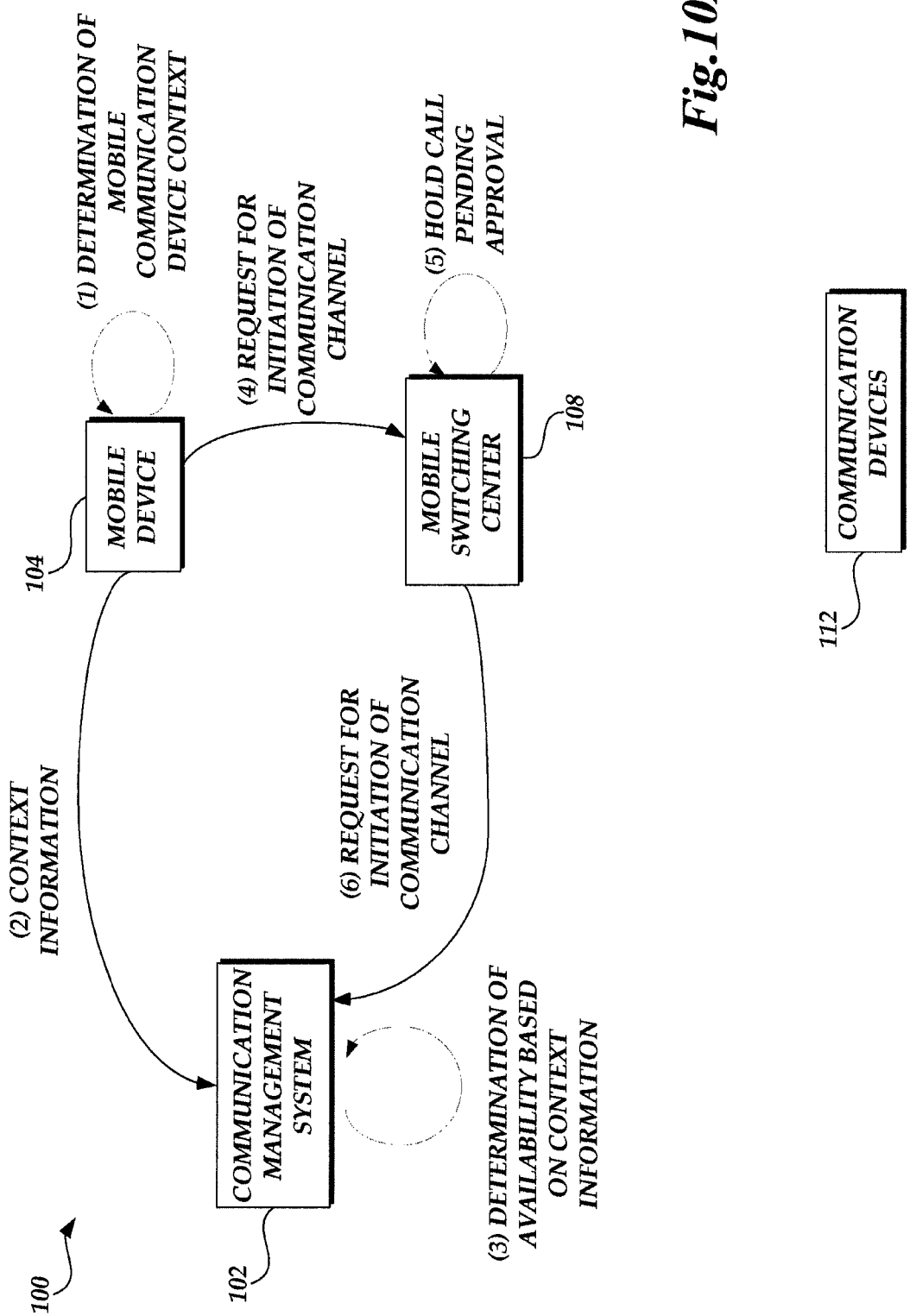
FIGS. 10A-10C are block diagrams of the communication management system of FIG. 1 illustrating the transmission of mobile communication device context information by a mobile device and the processing by the communication management system of communication channel initiation requests submitted by the mobile communication device.
Figure 10B:
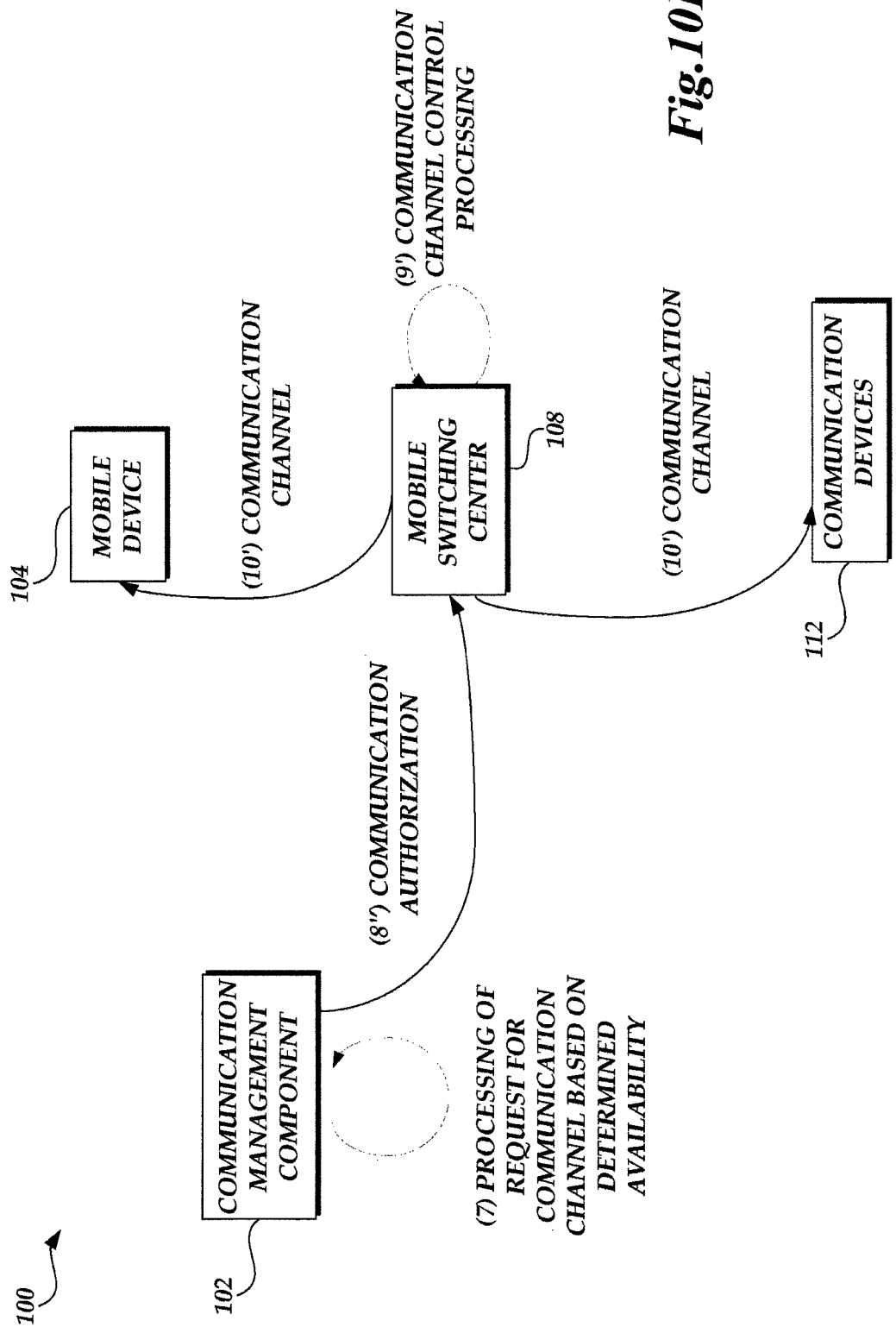
Figure 10C:
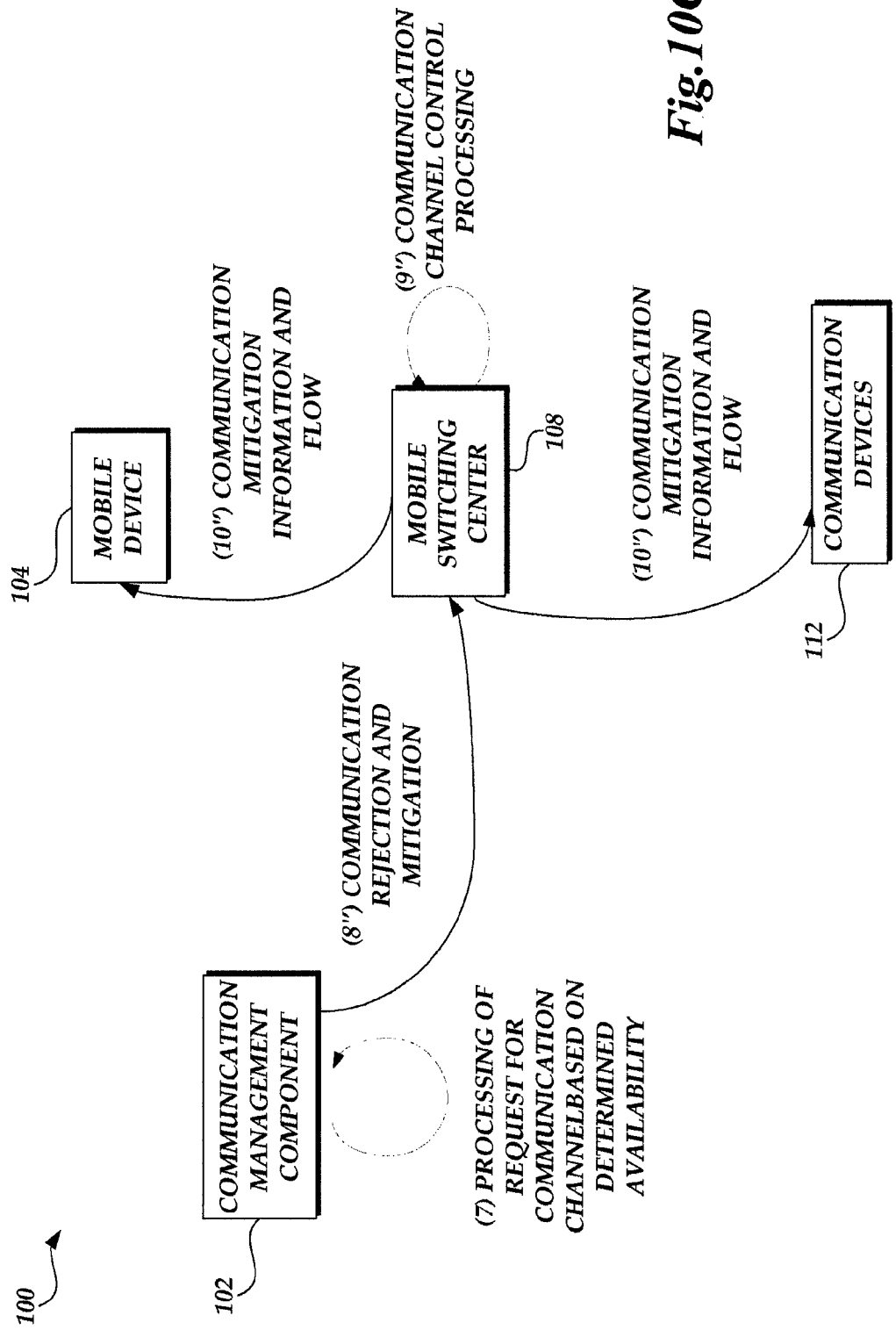

With reference now to FIGS. 10A-10C, one embodiment processing of a request from a user at a mobile communication device 104 to establish a communication channel, such as an audio call, with a third party communication device 112 will be described. As described above with regard to FIGS. 4A and 4B, for the illustrative example, it is assumed that a particular mobile computing device 104 has registered with a communication management service that provides the communication management system 102 and provisioned a mobile communication device profile that identifies the availability of the mobile communication device for particular mobile communication device contexts.

As illustrated in FIG. 10A, during the operation of the mobile communication device 104, or during an initialization of the mobile communication device, the mobile communication device interface component 306 obtains a set of inputs corresponding to the mobile communication device environment. The set of inputs are processed by the mobile communication device context processing component 304 to generate mobile communication device context information. The communication management system communication component 302 then transmits the mobile communication device context information to the communication management system 102 as appropriate. Specifically, to reduce power consumption and/or bandwidth consumption, the communication management system communication component 302 may limit the transmission of mobile communication device context information for the initialization of a mobile communication device context, a detection of a change in mobile communication device context and/or for the re-establishment of a mobile communication device context. Examples of context assessment algorithms were previously identified with regard to FIGS. 5-9.

Upon receipt of the context information, the mobile device communication component 202 transmits the context information to the communication processing component 204 for processing. The communication processing component 204 obtains one or more corresponding, or applicable, mobile communication device profiles from the mobile communication device profile data store 210. The communication processing component 204 then determines the availability of the mobile communication device to establish a communication channel (either receipt of a request or the initiation of a request) based on the processing.

Thereafter, in the illustrative example of FIG. 10A, the mobile device 104 initiates a request to establish a communication channel with a communication device 112, such as a third party communication device 112. The request is received by the mobile switching center 108 and is held pending an approval or rejection by the communication management system 102. The applicable mobile switching center 108 then transmits the request to the mobile service provider communication component 208, along with additional information, such as the identification information (e.g., telephone number) of the third party communication device 112.

With reference now to FIG. 10B, upon receipt of the request or notification from the mobile switching center 108, the communication processing component obtains applicable communication profiles using the identification information or other information and utilizes the predetermined availability of the mobile communication device 104 to authorize or reject the establishment of the communication channel. If the request to initiate the communication channel is authorized, the authorization is transmitted to the mobile switching center 108, which processes the request for initiation of the communication channel in a typical manner. Accordingly, the requested communication channel is completed. As will be described in greater detail below with regard to FIG. 15, the communication management system 102 may continue to monitor the established communication channel for a change in mobile communication device context.

With reference now to FIG. 10C, alternatively, if the request for initiation of the communication channel is rejected based on a determined unavailability of the mobile communication device 104, the communication management component 102 transmits a rejection authorization communication to the mobile switching center 108 to prevent the initiation of the communication channel. Additionally, the communication mitigation component 206 can provide appropriate notifications to the users of the mobile communication device 104 and the communication device 112. Additionally, the communication management component 102 can obtain a selection of a communication channel alternative as will be described in greater detail below.

Figure 11:
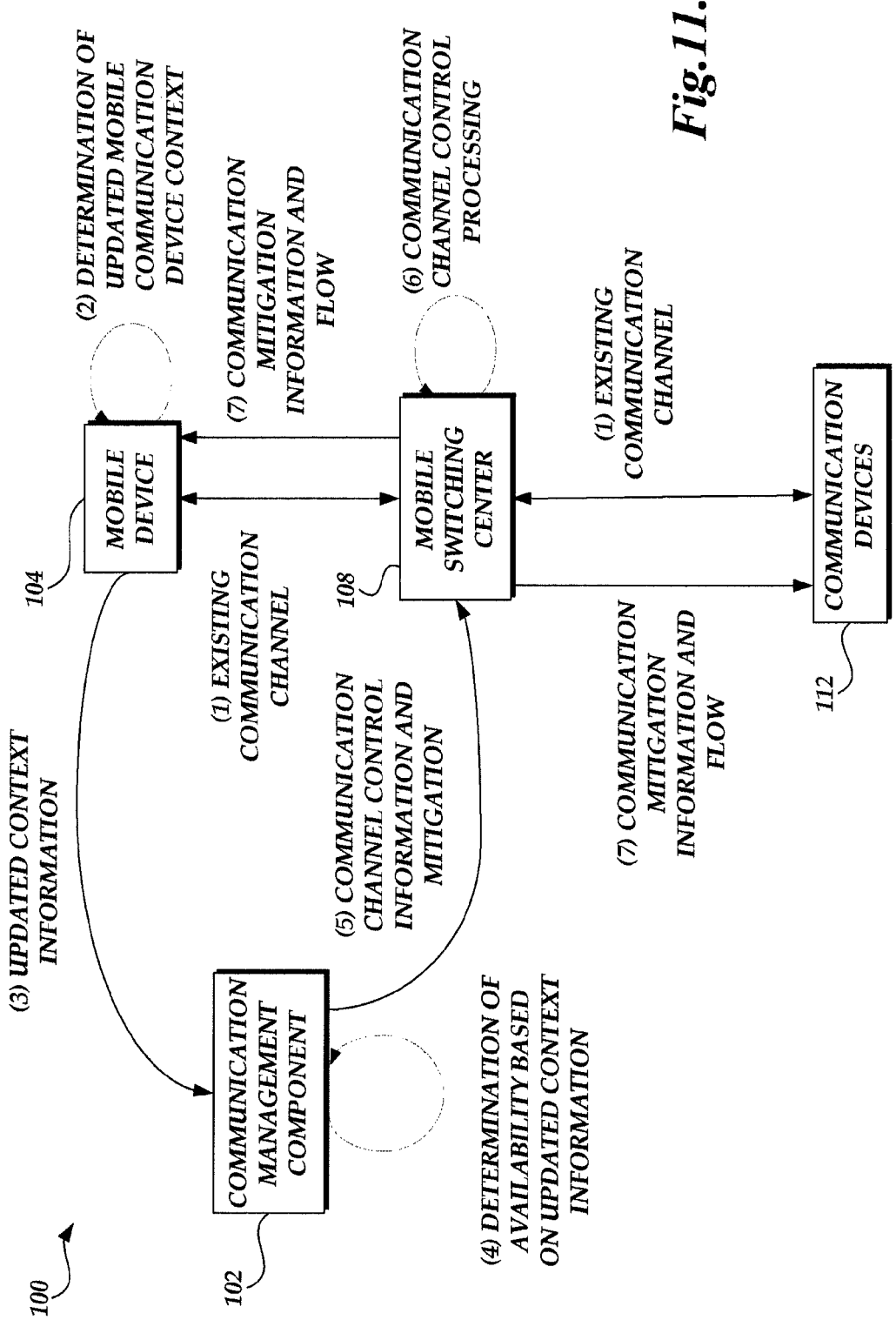
FIG. 11 is a block diagram of the communication management system of FIG. 1 illustrating the transmission of updated mobile communication device context information by a mobile communication device and the processing of an ongoing communication channel by the communication management system.

With reference now to FIG. 11, in the event that a communication channel has been established between a mobile communication device 104 and a communication device 112, the communication management system 102 continues to determine the availability of the mobile communication device 104 to remain in the established communication channel. As illustrated in FIG. 11, the mobile communication device 104 continues to receive sensor information and determine mobile communication device context information. In the event that the mobile communication device context information has changed or is otherwise no longer valid, the communication management component 302 of the mobile device mobile transmits the updated mobile communication device context information to the communication management system 102. In one embodiment, the mobile device communication component 202 may only transmit updated context information in the event that a change in context is determined. Alternatively, the mobile device communication component 202 may transmit update context information after a predetermined time. Because the mobile device 104 has an established communication channel with the communication device 112, the communication management system communication component 302 may have to utilize a different communication channel (such as an SMS channel) to transmit the updated context information if the communication channel previously utilized to transmit the context information is being utilized for the established communication channel.

Upon receipt of the context information, the mobile device communication component 202 transmits the context information to the communication processing component 204 for processing. The communication processing component 204 obtains one or more corresponding, or applicable, mobile communication device profiles from the mobile communication device profile data store 210. The mobile communication device profile may be the same profile previously utilized to determine the availability of the mobile communication device or an additional or alternative mobile communication device profiles. As previously described, the selection of the appropriate or applicable profile stores can include the utilization of identification information, such as caller ID information. The communication processing component 204 then determines the availability of the mobile communication device to maintain the established communication channel based on the profiles. If it is determined to maintain the established communication channel, the communication management system 102 can transmit an authorization message or remain silent. Alternatively, if the communication channel should be terminated based on a determined unavailability of the mobile communication device 104, the mobile service provider communication component can transmit communication channel control information that includes a termination notification to the mobile switching center 108. Additionally, the communication mitigation component 206 can provide appropriate communication channel mitigation information, such as notifications to the users of the mobile communication device 104 and the communication device 112 and provide a selection of a communication channel alternative as will be described in greater detail below.

Mobile Device Context Assessment Algorithms

With reference now to FIGS. 12A-12E, an illustrative routine 1200 implemented by the mobile communication device context processing component 304 for determining context information of a mobile communication device 104 will be described. As described above, the mobile communication device context can correspond to a determination of a specific transit state indicative of a current mobile communication device environment. The availability for a communication channel may be based on the determined transit state and the appropriate mobile communication device profile. With reference to an above mentioned example, a user can provision a mobile device profile such that calls from an identified user are rerouted automatically to a voicemail system in the event that mobile device (e.g., the user) is in a city/urban transit state. As will be described, in event that the mobile communication device 104 determines it is currently in a city/urban transit state, the mobile communication device transmits the updated context information to the communication management component 102, which determines the availability/unavailability information based on the updated context information for all profiles. Thereafter, calls from the identified users are rerouted automatically without the need to poll the mobile communication device 104 until the mobile communication device provides updated context information.

Examples of two transit state context algorithm state diagrams were presented with regard to FIGS. 5-7. However, one skilled in the relevant art will appreciate, however, that the specific algorithms and variables described in this disclosure, including the example state diagrams of FIGS. 5-7 and in routine 1200 (FIG. 12)*are* illustrative in nature and should not be construed as limiting. Accordingly, variations or alternatives may be implemented, such as the removal of one or more transit states, different progression of transit states, and the specific criteria utilized to transition between transit states are within the spirit and scope of the present invention.

Figure 12A:
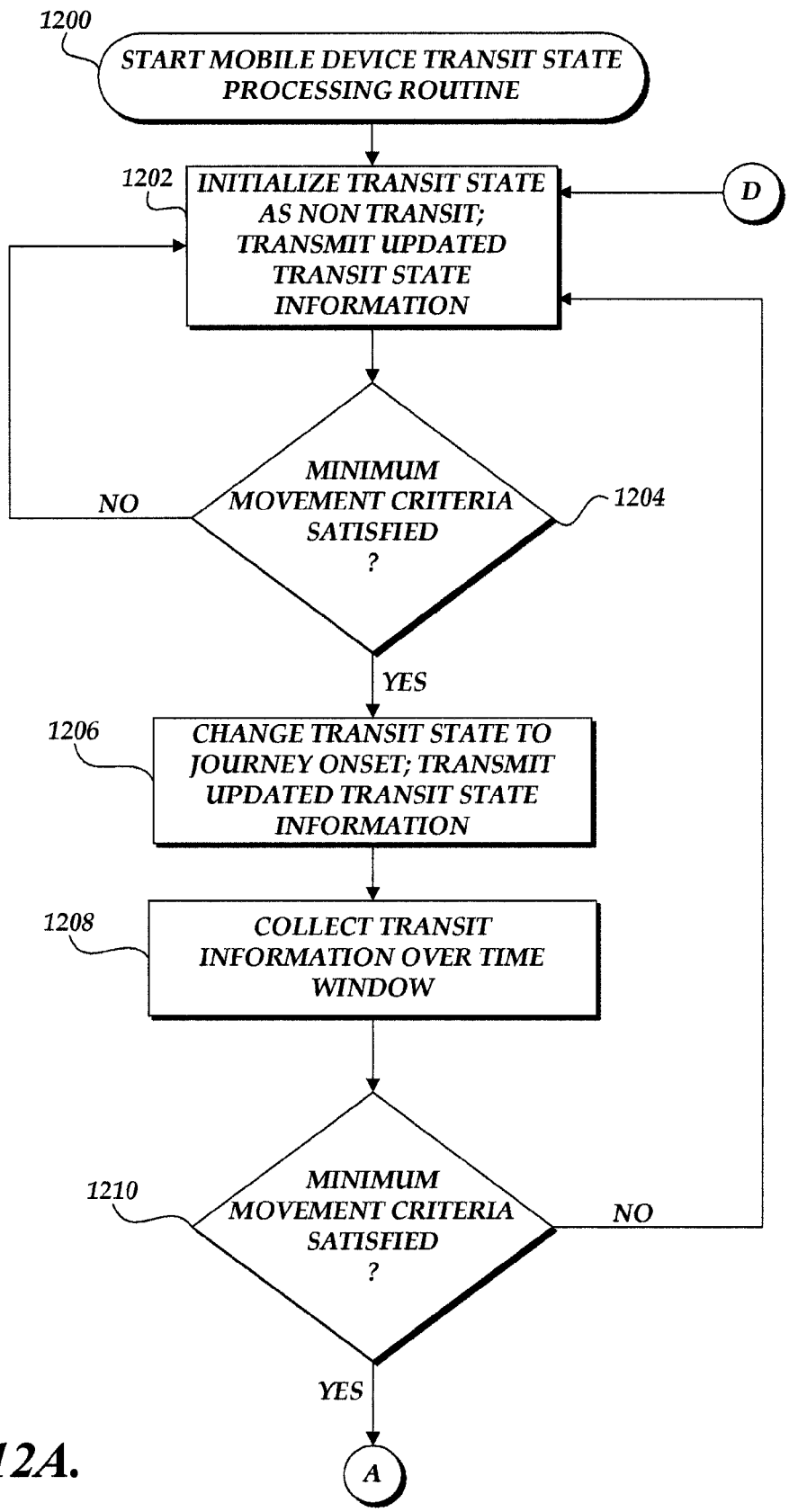
FIGS. 12A-12E are flow diagrams illustrative of travel state context assessment algorithm implemented by a mobile communication device in providing mobile communication device context information to a communication management system.

With reference now to FIG. 12A, at block 1202, the routine 1200 begins with the initialization of the transit state to non-transit by the mobile communication device context processing component 304. In an illustrative embodiment, the non transit state is a first state indicative of when the mobile communication device 104 is powered on or begins tracking transit state. The initialization of the transit state to non transit may be transmitted to the communication management system 102 or may be assumed as the starting context for the mobile communication device 104. At decision block 1204, a test is conducted to determine whether minimum movement criteria have been satisfied based on processing the set of inputs. For example, the test can correspond to a review of velocity input(s) and distance traveled input(s) to determine whether the input values exceed a minimum threshold.

Velocity and distance information can be obtained by the mobile communication device through a variety of sensors and/or components designed to generate or calculate such information. Examples include, but are not limited to, GPS devices/components, accelerometers, navigational equipment, and the like. As previously described, the sensors and/or components may be integrated into the mobile communication device 104 or may be separate components (e.g., a car navigation system) that provide the input information via a wired or wireless connection.

In another example, the velocity and distance information may be calculated by the mobile communication device 104 through by the utilization of recognizable or detectable objects. In accordance with this example, the mobile communication device 104 receives signals generated by fixed transmitters, such as cellular communications base stations or WiFi wireless nodes, which generally include some identification information specific to the particular transmitter, such as an SSID for a wireless node. As a mobile communication device 104 travels, signals from specific transmitters are detected when the mobile communication device is within range of the transmitter and no longer detected when the mobile communication device is beyond the range of the transmitter. For known communication ranges of transmitters, such as WiFi wireless nodes, velocity and distance traveled information may be calculated based on monitoring time from the detection of a signal from a transmitter to loss of the signal. Additionally, the detection of the signal from the transmitter would not require registration with the transmitter and could still be practiced with transmitters that restrict access, such as through encrypted transmissions.

If the minimum movement criteria have not been satisfied, it is assumed that the mobile communication device (considering its environment) is still in a non-transit state and the routine 1200 returns to block 1202. The routine 1200 may continue to loop through this portion for any amount of time.

Alternatively, if the minimum movement criteria have been satisfied, it is assumed that the mobile communication device 104 (considering its environment) is in motion, and at block 1206, the transit state is changed to a "journey onset state." Because the transit state has changed, the mobile communication device 104 may transmit updated context information to the communication management component 102 indicative of the change in transit state to a journey onset state. At block 1208, the mobile communication device context processing component 304 enters an observation window for collecting the various inputs over a period of time. The observation window can be configured such that the mobile communication device 104 collects a fixed number of sets as defined by an information collection interval over a time period. Each time a set of inputs is collected a counter is decremented and the process continues until the targeted number of sets on inputs have been collected (e.g., the counter is decremented to a value of "0"). Additionally, if the mobile communication device environment interface 306 is currently not receiving inputs, or otherwise not accepting inputs, the mobile communication device 104 may enter a lower power consumption mode in which one or more components of the mobile communication device 104 become inactive or enter in a low power consumption mode of operation. In turn, the mobile communication device 104 then powers up, or wakes up, at the next information collection interval. The specific information collection interval implemented by the mobile communication device context processing component 304 may be dependent on the granularity of the sensor information, the amount of input information that should be collected for a given transit state, and/or the likelihood of a potential change in transit state. For example, a longer collection interval can be set for transit states in which variations in the set of inputs is not expected (e.g. a highway transit state) to further conserve mobile communication device power.

Upon the expiration of the time window, at decision block 1210, a test is conducted to determine whether minimum movement criteria have been satisfied based on processing the set on inputs. If the minimum movement criteria have not been satisfied, the mobile communication device 104 is determined to be no longer in motion and the routine 1200 returns to block 1202 to a "non transit" travel state (described above). Because the transit state has changed, the mobile communication device 104 may transmit updated context information to the communication management component 102 indicative of the change in transit state back to a non transit state.

Figure 12B:
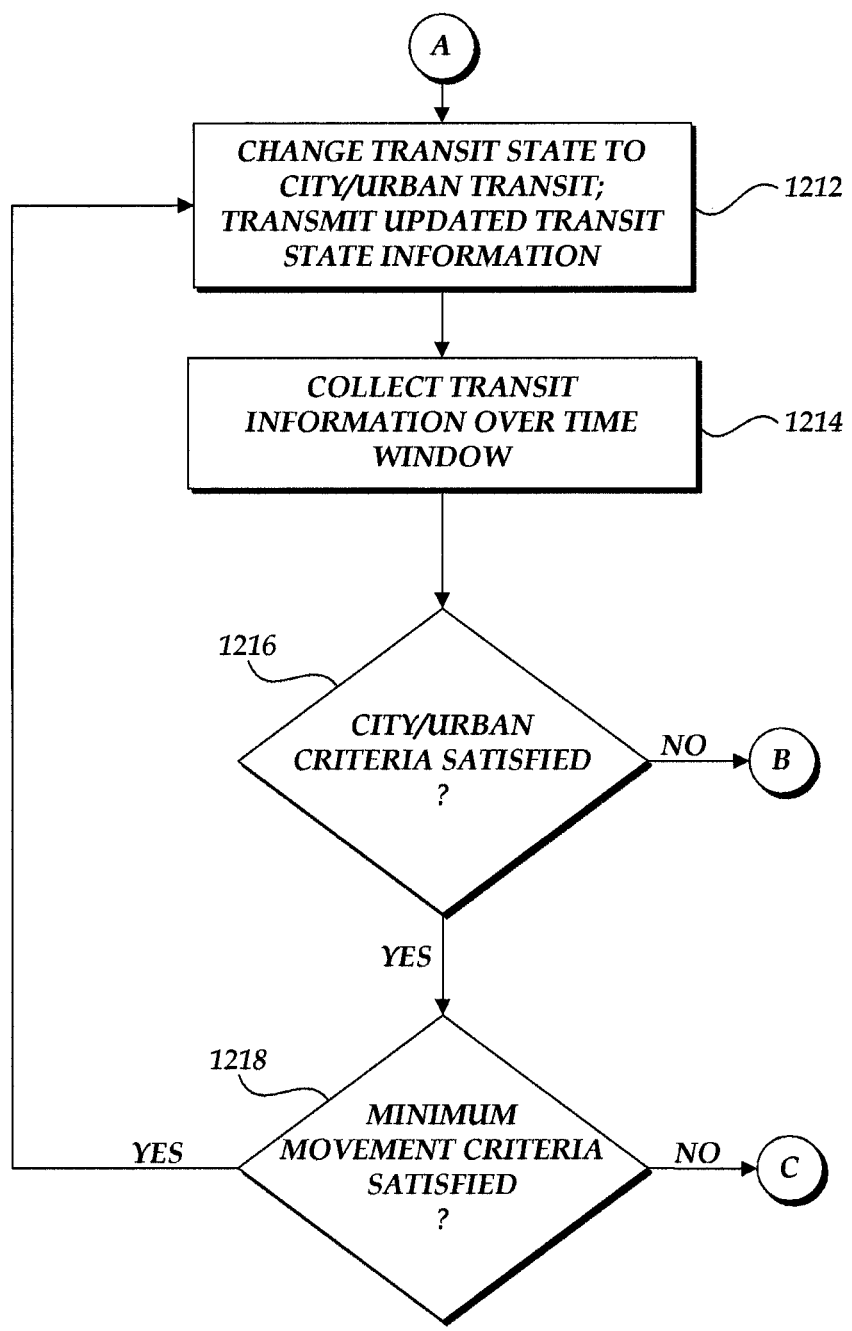

With reference now to FIG. 12B, alternatively, if at decision block 1210 (FIG. 12A), the minimum movement criteria have been satisfied, at block 1212, the mobile communication device 104 is determined to be in motion and the transit state is changed to a "city/urban" transit state. In an illustrative embodiment, the city/urban transit state can correspond to the driving conditions experienced in city or urban areas in which there are frequent stops and wide changes in velocity. Again, because the transit state has changed, the mobile communication device 104 may transmit updated context information to the communication management component 102 indicative of the change in transit state back to a non transit state. At block 1214, the mobile communication device context processing component 304 enters an observation window that defines a set of intervals for collecting multiple sets of inputs over a period of time. In a city/urban transmit state, the collection interval for receiving each set of inputs may be configured to be shorter because of the potential for greater variances in the information from set of inputs.

At decision blocks 1216-1218, the mobile communication device context processing component 304 processes the collected input data to determine whether the mobile communication device 104 should remain in its current city/urban transit state, whether the mobile communication device has reached a terminus state, or whether the transit state is more indicative of another transit state typically indicative of highway travel. The collected information can include velocity, bearing, and distance traveled information. Additionally, the collected information can include processed velocity, bearing and distance traveled information, referred to as variance information, that indicate variances and/or rates of variance in the velocity, bearing and distance traveled over each of the collection intervals in the observed time window.

Figure 12C:
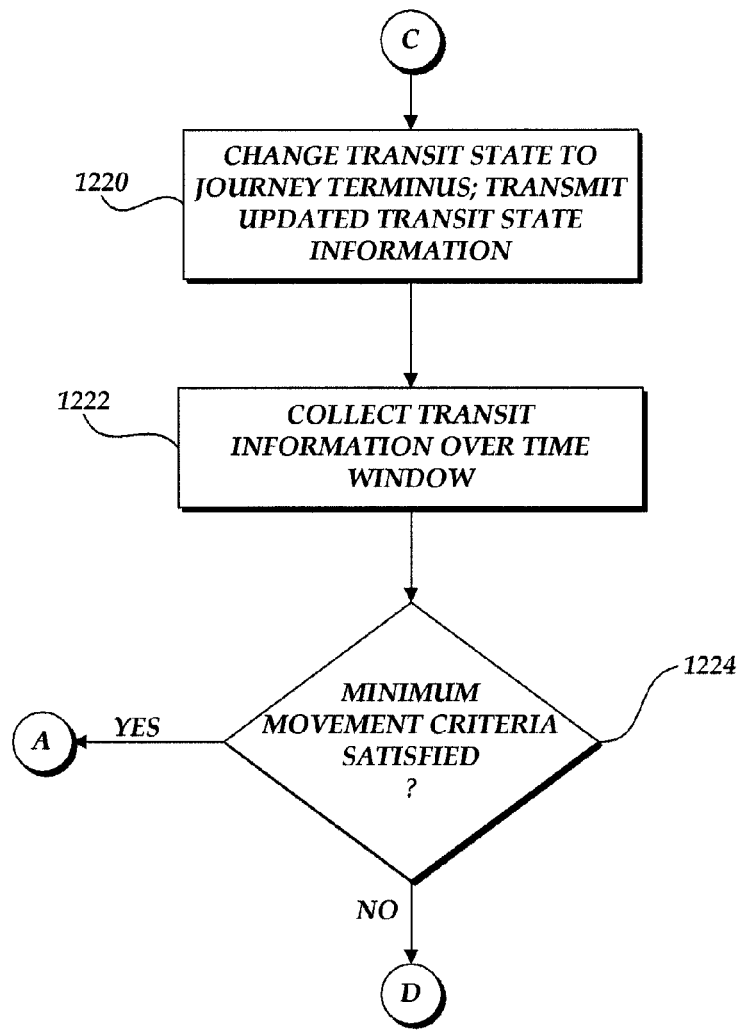

At decision block 1216, a test is conducted to determine criteria indicative of city/urban transit state have been satisfied. The criteria indicative of city/urban transit state can correspond to consideration of variance thresholds for velocity, distance traveled and bearing that are indicative of patterns of city/urban travel. For example, velocity variances for a city/urban transit state may be indicative of a collection of inputs at a time in which a vehicle is stopped (e.g., at a street light) and another collection when the vehicle is traveling at a higher velocity. The thresholds may be determined by observed driving behavior, set by an administrator or set by a particular user. If the criteria indicative of city/urban transit state have not been satisfied, the mobile communication device context processing component 304 determines that the mobile communication device 104 is not likely in a city/urban driving embodiment and moves to block 1226, which will be described in greater detail below. Alternatively, if the criteria indicative of city/urban transit state have been satisfied, the mobile communication device context processing component 304 determines that the mobile communication device 104 should either remain in a city/urban travel state or has reached a terminus. Accordingly, at decision block 1218, a test is conducted to determine whether minimum movement criteria have been satisfied based on processing the set on inputs. If the minimum movement criteria have not been satisfied, the mobile communication device 104 is determined to be no longer in motion and the routine 1200 proceeds to block 1220 (FIG. 12C). Alternatively, if the minimum movement criteria have been satisfied, the routine 1200 returns to block 1212. In this instance, however, the mobile communication device 104 does not need to transmit context information to the communication management component 102 because the transit state has not changed.

With reference now to FIG. 12C, at block 1220, the transit state of the mobile communication device is changed to a "journey terminus" transit state. In an illustrative embodiment, the journey terminus transit state can correspond to the completion of the initial travel. As previously described, because the transit state has changed, the mobile communication device 104 may transmit updated context information to the communication management component 102 indicative of the change in transit state. At block 1222, the mobile communication device context processing component 304 enters an observation window in which a collection interval may be set to a shorter time period because of the expectation for a higher variance between the sets of inputs at each collection interval.

Upon the completion of the observation window, the mobile communication device context processing component 304 will determine whether the mobile communication device has re-entered a travel state (e.g., after a temporary stop) or has entered a non-transitory state (e.g., at home or at the office). Accordingly, at decision block 1224, a test is conducted to determine whether a minimum movement has been detected based on the set on inputs. If minimum movement has not been detected, the mobile communication device 104 is determined to be no longer in motion. Accordingly, the transit state is changed to "non transitory" at block 1202 (FIG. 12A). Alternatively, if a minimum movement has been detected based on the set on inputs, the mobile communication device 104 is determined to be in transit again and the routine 1200 proceed to block 1212 (FIG. 12B) in which the transit state is changed to city/urban transit state. In both decision alternatives, the mobile communication device 104 transmits updated context information to the communication management component 102 indicative of the change in transit state.

Figure 12D:
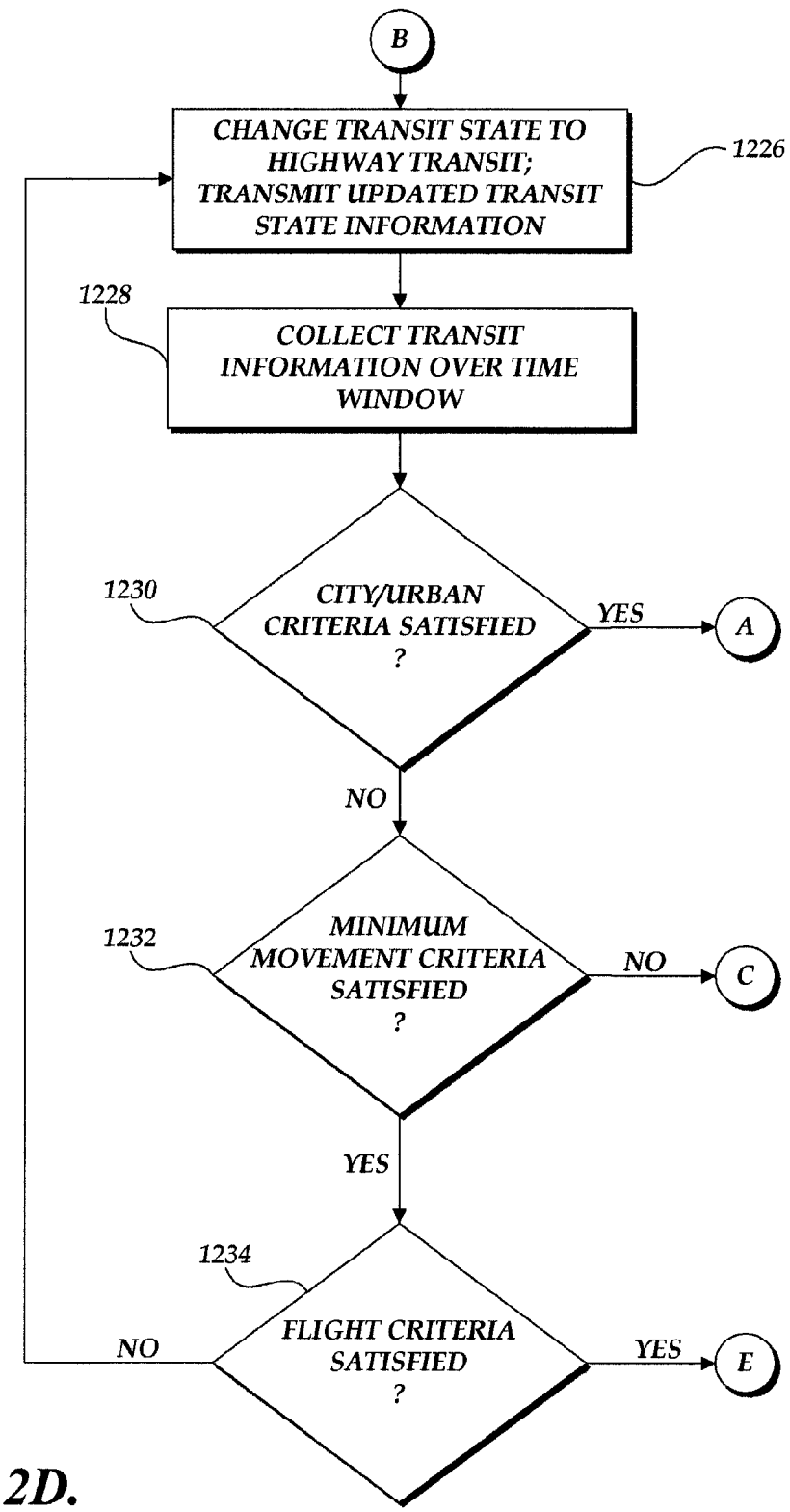

With reference now to FIG. 12D, if at decision block 1216 (FIG. 12B), the criteria indicative of city/urban transit state were not satisfied, the mobile communication device context processing component 304 determines that the mobile communication device is a highway transit state, indicative of highway travel. Accordingly, at block 1226, the transit state is changed to a "highway" traveled state and the mobile communication device 104 transmits updated context information to the communication management component 102 indicative of the change in transit state. At block 1228, the mobile communication device context processing component 304 enters an observation window in which a collection interval may be set to a longer time period because of the expectation for a lower variance between the sets of inputs at each collection interval. When the mobile communication device 104 is a highway transit state, it can transition to a terminus state (e.g., indicative of a completion of travel), revert back to a city/urban transit state or remain in a highway transit state. Additionally, in an optional embodiment, the mobile communication device context processing component 304 can determine that the mobile communication device 104 is a flight state indicative of airplane travel. Accordingly, as will be illustrated in FIG. 12D, the mobile communication device context processing component 304 can also reach an "in flight" transit state from the highway traveled state. In all the decision alternatives involving a change in transition state, the mobile communication device 104 transmits updated context information to the communication management component 102 indicative of the change in transit state.

At decision block 1230, a test is conducted to again determine whether criteria indicative of city/urban transit state has been satisfied. If the city criteria indicative of city/urban transit state has been satisfied, the mobile communication device context processing component 304 determines that the mobile communication device 104 should revert back to a city/urban travel state and the routine 1200 returns to block 1212 (FIG. 12B). Alternatively, if the criteria indicative of city/urban transit state has not been satisfied, the mobile communication device context processing component 304 determines that the mobile communication device 104 should either remain in the highway transit state, move to a journey terminus state, or move to an in flight state. Accordingly, at decision block 1232, a test is conducted to determine whether a minimum movement has been detected based on the set on inputs. If the minimum movement has not been detected based on the set on inputs, the mobile communication device 104 is determined to be no longer in motion and the routine 1200 proceeds to block 1220 (FIG. 12C).

If, however, at decision block 1232, the minimum movement has been detected based on the set on inputs, at decision block 1234, a test is then conducted to determine whether criteria indicative of an in-flight transit state has been satisfied. In an illustrative embodiment, criteria indicative of an in-flight transit state can correspond to consideration of variance thresholds for velocity, distance traveled and bearing that are indicative of patterns of air travel. The criteria may also include consideration of information from altimeters or the like. The thresholds may be determined by observed driving behavior, set by an administrator or set by a particular user. If the criteria indicative of an in-flight transit state has not been satisfied, the mobile communication device context processing component 304 determines that the mobile communication device should remain in a highway transit state and the routine 1200 returns to block 1226.

Figure 12E:
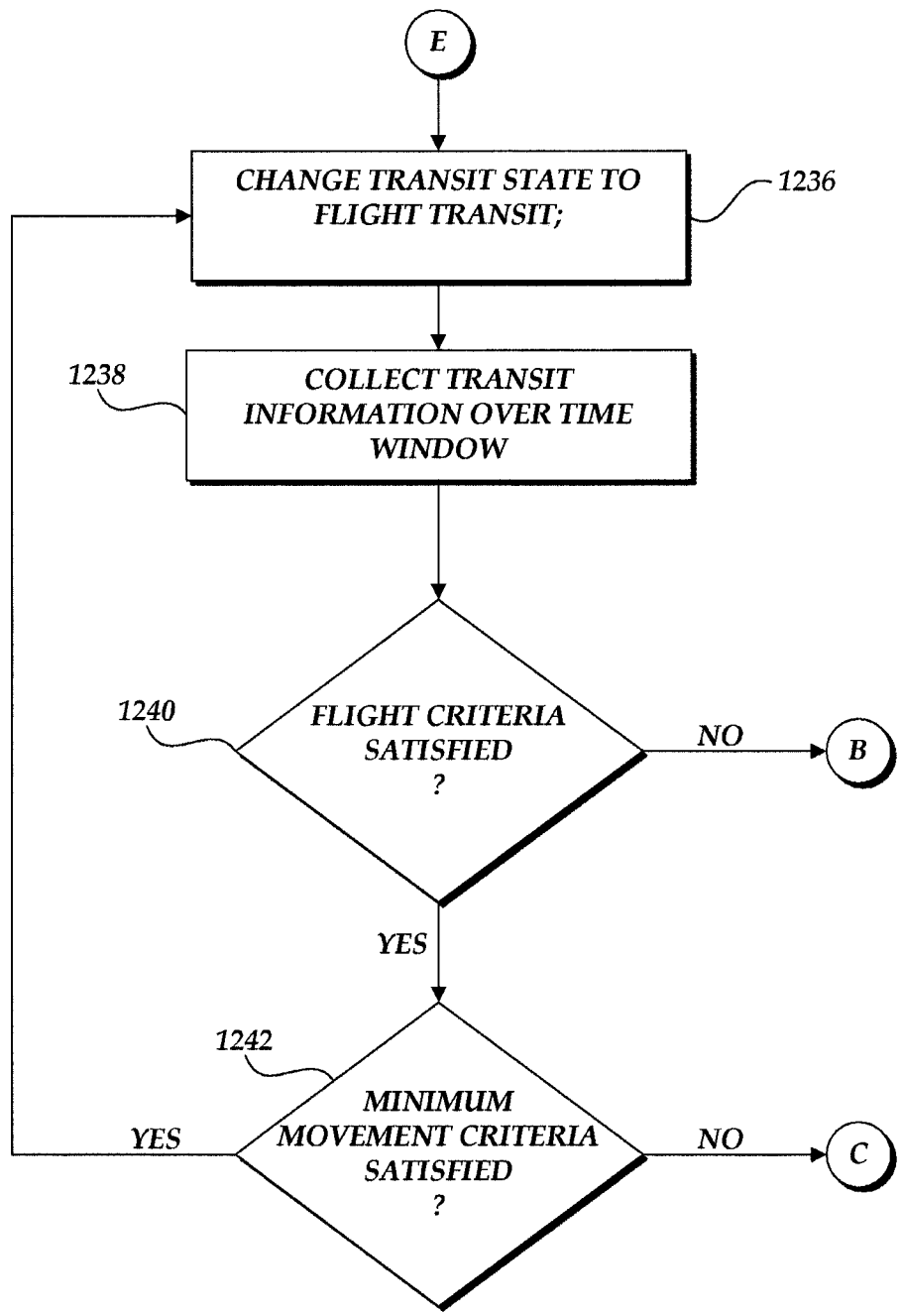
Figure 13:
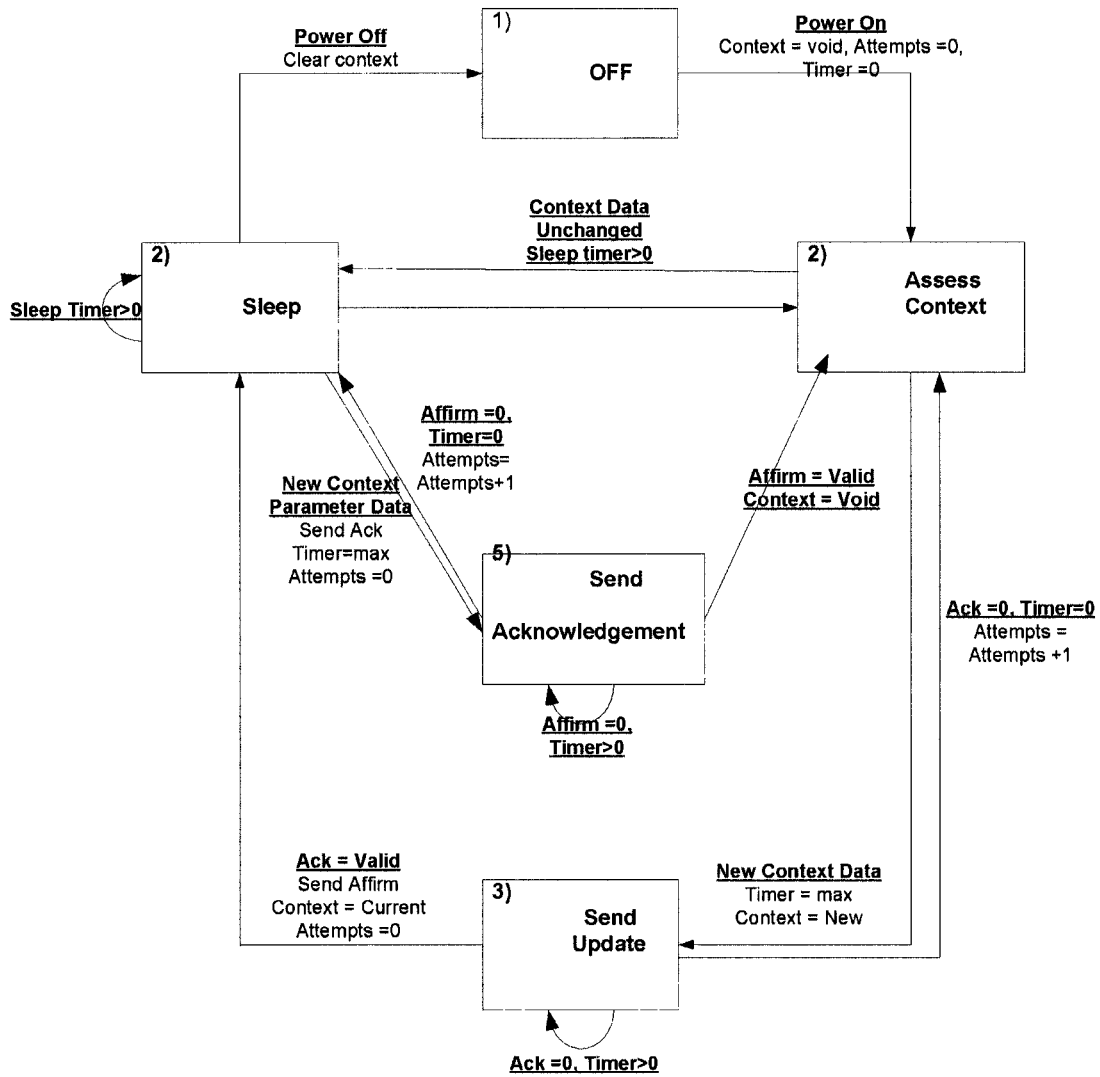
FIG. 13 is a block diagram illustrative of a mobile communication device context management state diagram implemented by a mobile communication device for managing context information.

With reference now to FIG. 12E, if the criteria indicative of an in-flight transit state has been satisfied, the mobile communication device context processing component 304 determines that the mobile communication device is in flight. Accordingly, at block 1236, the transit state is changed to an "in flight" transit state. At block 1238, the mobile communication device context processing component 304 enters an observation window for collecting the various inputs over a period of time, which may be a longer time period. At decision block 1230, a test is conducted to determine whether is conducted to determine whether one or more in flight distance variances have been exceeded. If the criteria indicative of an in-flight transit state has not been satisfied, the mobile communication device context processing component 304 determines that the mobile communication device 104 should revert back to a highway travel state and the routine 1200 returns to block 1226 (FIG. 12D). Alternatively, if the criteria indicative of an in-flight transit state has been satisfied, the mobile communication device context processing component 304 determines that the mobile communication device 104 should either remain in the in flight distance transit state or move to a journey terminus state. Accordingly, at decision block 1240, a test is conducted to determine whether a minimum movement has been detected based on the set on inputs. If the minimum movement has not been detected based on the set on inputs, the mobile communication device 104 is determined to be no longer in motion and the routine 1200 proceeds to block 1220 (FIG. 12C). Alternatively, if minimum movement has been detected based on the set of inputs, the routine 1200 remains in an in-flight transit state and the routine 1200 returns to block 1236. In all the decision alternatives involving a change in transition state, the mobile communication device 104 transmits updated context information to the communication management component 102 indicative of the change in transit state.

Figure 14:
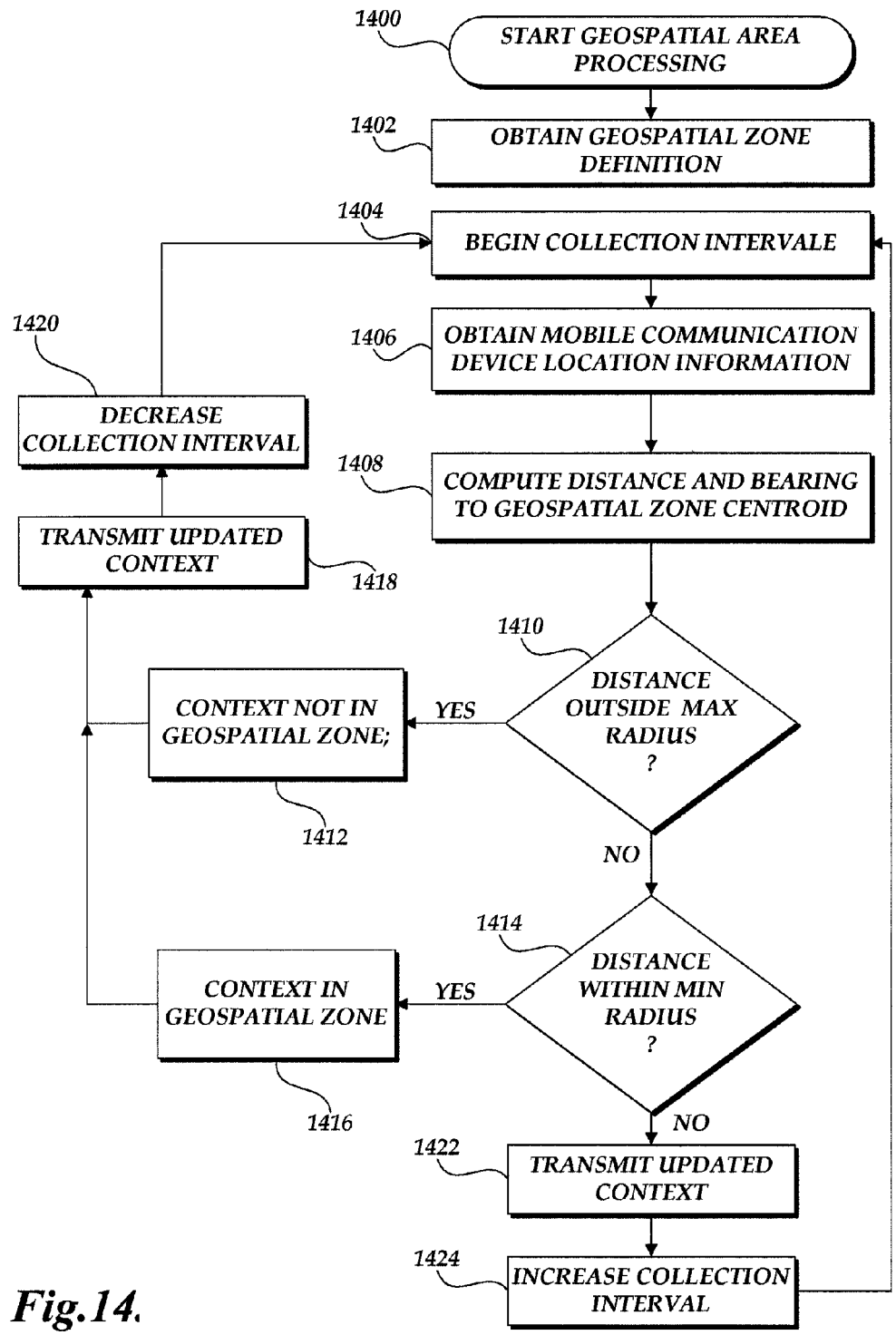
FIG. 14 is a flow diagram illustrative of a geospatial context assessment algorithm implemented by a mobile communication device in providing mobile communication context information to a communication management system.

With reference now to FIG. 14, a routine 1400 implemented by the mobile communication device context processing component 304 for determining mobile communication device geospatial context information will be described. In an illustrative embodiment, geospatial information may be defined for a geographic region. The geospatial information can include a centroid, which corresponds to an approximation of the geospatial region's central position. The centroid can be defined in terms of a longitude and latitude, x and y coordinates in a grid-type layout or other position coordinates. The geospatial information can also include a minimum radius distance that corresponds to a minimum radius that is within all boundaries of the geospatial region. The geospatial information can further include a maximum radius that corresponds to a maximum radius that is beyond all boundaries of the geospatial region. One skilled in the relevant art will appreciate that the contours of boundaries of a geospatial region can be defined in terms of a radius distance plus bearing from the centroid.

Examples of two geospatial state context algorithm state diagrams were presented with regard to FIGS. 8 and 9. However, one skilled in the relevant art will appreciate, however, that the specific algorithms and variables described in this disclosure, including the example state diagrams of FIGS. 8 and 9 and in routine 1400 (FIG. 14) are illustrative in nature and should not be construed as limiting. Accordingly, variations or alternatives may be implemented, such as the removal of one or more transit states, different progression of transit states, and the specific criteria utilized to transition between transit states are within the spirit and scope of the present invention.

With reference to FIG. 14, at block 1402, the mobile communication device context processing component 304 obtains the geospatial region definitions from the mobile communication device context data store 308. The geospatial region definitions may be stored and maintained in a variety of formats and storage media. Additionally, the geospatial region definitions may be prioritized in terms of order of processing by the mobile communication device 104. At block 1404, the mobile communication device environment interface 306 begins a collection window in which a geospatial zone definition is evaluated to determine whether the mobile communication device 104 is within the zone. As described above with regard to transit state context assessment algorithms, the observation window can be configured such that the mobile communication device 104 collects a fixed number of sets as defined by an information collection interval over a time period. Each time a set of inputs is collected a counter is decremented and the process continues until the targeted number of sets on inputs have been collected (e.g., the counter is decremented to a value of "0"). Additionally, if the mobile communication device environment interface 306 is currently not receiving inputs, or otherwise not accepting inputs, the mobile communication device 104 may enter a lower power consumption mode in which one or more components of the mobile communication device 104 become inactive or enter in a low power consumption mode of operation. In turn, the mobile communication device 104 then powers up, or wakes up, at the next information collection interval. The specific information collection interval implemented by the mobile communication device context processing component 304 may be dependent on the granularity of the sensor information, the amount of input information that should be collected for a given transit state, and/or the likelihood of a potential change in transit state. For example, a longer collection interval can be set for transit states in which variations in the set of inputs is not expected to further conserve mobile communication device power.

At block 1406, the mobile communication device context processing component 304 obtains mobile communication location information. In an illustrative embodiment, the mobile communication device environment interface 306 can obtain various sensor information indicative of a location or relative location of the mobile communication device. For example, the mobile communication device environment interface 306 can obtain GPS information from an attached GPS component or via wireless communication from another GPS component. In another example, the mobile communication device environment interface 306 can interface with a vehicle's navigation system to obtain location information. In still another example, the mobile communication device environment interface 306 can interface with wireless communication equipment, such as cellular base stations, wireless network nodes (e.g., WiFi and WiMax network nodes), and obtain location information. Additionally, the sensor information can include accelerometers and compass information that facilitates a bearing or direction of the mobile communication device.

In an additional embodiment, and as illustrated in FIG. 9, the mobile communication device environment interface 306 can associate location meta data with known signals from wireless transmitters such that a detection of a signal can provide an indication to the mobile communication device environment interface 306 of the relative location of a mobile communication device 104. As explained above with regard to FIG. 12, as a mobile communication device 104 travels, signals from specific transmitters are detected when the mobile communication device is within range of the transmitter and no longer detected when the mobile communication device is beyond the range of the transmitter. In embodiments in which the mobile device detects signals from the same wireless transmitters, the mobile communication device environment interface 306 can associate location meta data obtained from another location source (such as a GPS component) to the information indicative of the wireless transmitter, such as a WiFi SSID. Accordingly, in conjunction with the known range of the wireless transmitter, the mobile communication device environment interface 306 can estimate range, associate the location meta data as the approximate location of the mobile communication device 104 for purposes of evaluating context according geospatial zones.

For purposes of power consumption, the mobile communication device environment interface 306 can monitor various location sensors/inputs. The mobile communication device environment interface 306 can prioritize or rank the location information sources based on various factors, including degree of confidence in the accuracy of the location information, power consumption associated with collecting the location data, financial or service contract issues, and the like. For example, assume that a mobile communication device environment interface 306 has previously stored location information for a known WiFi wireless node in Meta data in the manner described above. Although location information may also be available for an attached GPS component, operation of the GPS component consumes much more device power. Accordingly, the mobile communication device environment interface 306 could choose to receive/use location information from a source with the least power consumption metrics.

With reference again to FIG. 14, at block 1408, the mobile communication device context processing component 304 calculates the distance and bearing of the current location of the mobile device to the centroid of geospatial zone. At decision block 1410, a test is conducted to determine whether the distance to the centroid is outside of the maximum radius defined for the geospatial zone. If so, at block 1412, the mobile device's current context is outside the geospatial zone. The routine 1400 then proceeds to block 1418, which will be described below.

If at decision block 1410, the distance to the centroid is not outside the maximum radius, the mobile communication device context processing component 304 will then determine whether the mobile communication device is clearly within the geospatial zone or on the fringe of boundary of the geospatial zone. At decision block 1414, a test is conducted to determine whether the distance is less than the minimum radius defined for the geospatial zone. If so, at block 1416, the mobile device's current context is inside the geospatial zone. The routine 1400 then proceeds to block 1418.

At block 1418, the mobile communication device 104 must transmit updated context information if a context state has changed. Accordingly, if the mobile communication device has not changed from outside the geospatial zone (block 1412) or within the geospatial zone (block 1416), no update will be provided. At block 1420, the interval for collection of location information and the evaluation of the proximity to the geospatial zone will be decreased (or verified to be at a lower level). In either the case of clearly outside the geospatial zone or clearly within the geospatial zone, the likelihood of a sudden change in context decreases. For example, for a geospatial zone corresponding to an entire city, the frequency in which the mobile device would detect a change corresponding to being detected outside the citywide geospatial zone would likely be low. Accordingly, the collection interval could be adjusted in an effort to mitigate power drain associated with the collection and processing of the sensor information. The routine 1400 then returns to block 1404 for continued collection and processing of the information at the next collection interval.

Turning again to decision block 1414, if the distance is not less than the minimum radius defined for the geospatial zone, the mobile communication device 104 is likely just within the boundary of the geospatial zone or just outside the boundary of the geospatial zone. Accordingly, the mobile communication device context processing component 304 can then determine with the mobile communication device 104 falls within or just without. If the determined context is a change from a previous context, at block 1422, the updated context information is transmitted to the communication management component 102. At block 1424, the collection interval is increased (or verified to be at a higher level). In the case of neither clearly outside the geospatial zone or clearly within the geospatial zone, the likelihood of a sudden change in context increases. Because of the potential for more likely changes in context, the interval for collection is increased. The routine 1400 then returns to block 1404 for continued collection and processing of the information at the next collection interval.

Communications Management Component Operation

Figure 15:
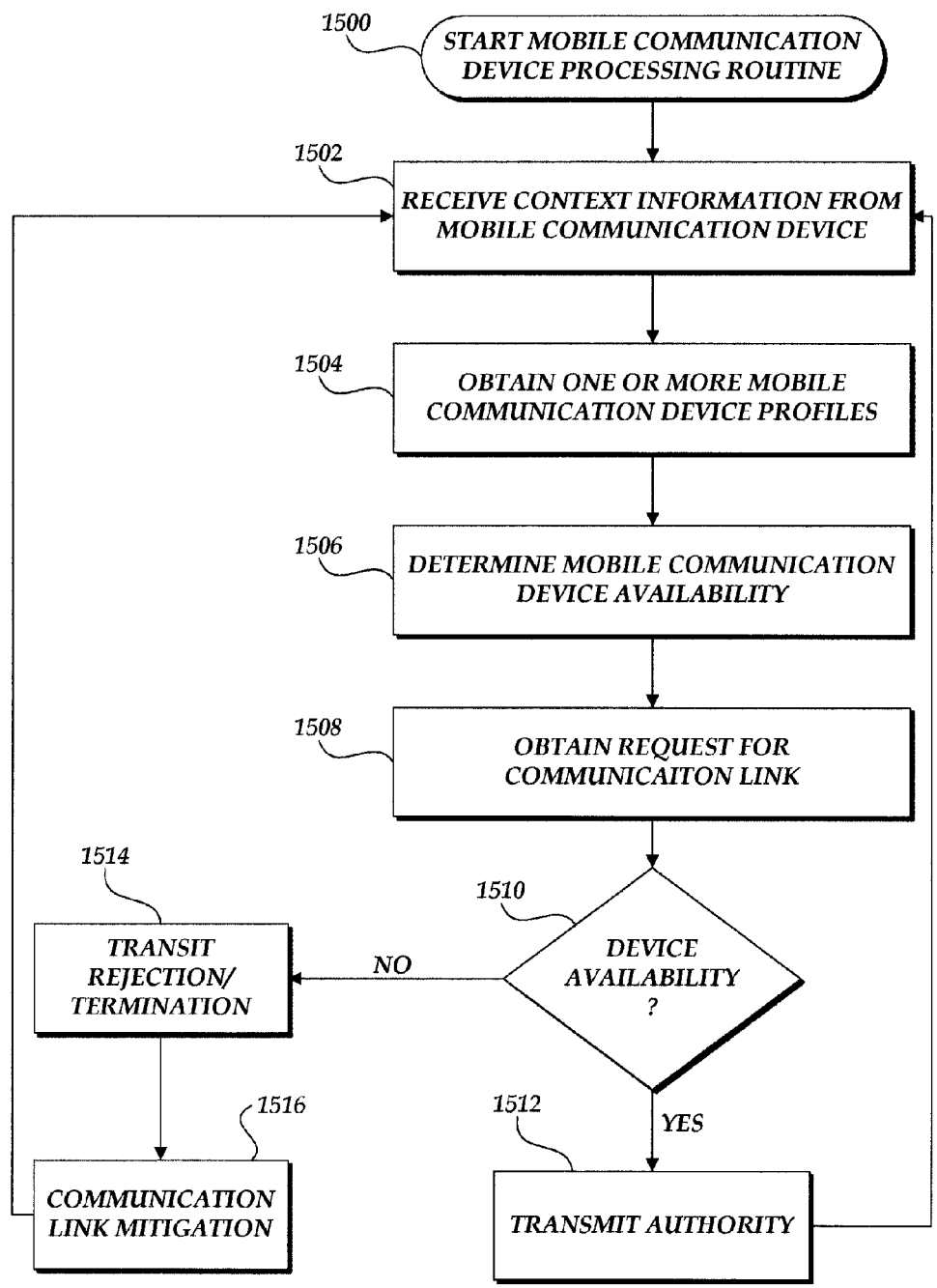
FIG. 15 is a flow diagram illustrative of a communication management routine implemented by a communication management system for managing communications according to mobile communication device context information.

With reference now to FIG. 15, a routine 1500 implemented by the communication processing component 204 to manage communications associated with a mobile communication device 104 will be described. At block 1502, the mobile communication device interface component 202 receives mobile communication device context information from the mobile communication device 104. The mobile communication device context information corresponds to processed inputs and is indicative of the mobile communication device context. Although not limiting, examples of illustrative context assessment algorithms/processes were described with regard to FIGS. 5-9, 12, and 14. The context information may require additional processing by the communication management system 102. As previously discussed, the mobile device communication component 202 may utilize any number of communication channels to receive the context information from the mobile communication device 104. Additionally, in the event that the context information corresponds to updated context information, especially if the mobile communication device is presently in an established communication channel, the mobile device communication component 202 may utilize alternative communication channels.

At block 1504, the communication processing component 204 obtains mobile communication device profile information from the mobile communication device profile store 210. The mobile communication profile data store 210 can correspond to a database that identifies different mobile communication device profiles according to different mobile communication device context. For example, a mobile communication device may have a profile for each defined geospatial region and transit state. In this illustrative embodiment, the profile defines the availability for communication channels for all incoming communication channel requests. In an alternative embodiment, the mobile communication device profile data store may maintain additional or supplemental profiles that define availability for various mobile communication device contexts according to particular or identifiable users or groups of users. In this embodiment, the profile information can correspond to a routing table that identifies availability according to context information with an identifiable user.

At block 1506, the communication processing component 204 determines the communication channel availability according to the profile information obtained at block 1504. The availability information may be determined upon receipt of the context information and/or may be updated upon receipt of updated context information. Additionally, if a communication channel is not already established, the availability is determined prior to receiving a request for establishing a communication channel from either the mobile communication device 104 or a third party communication device 112. Still further, the communication manage component 102 can also receive additional information from additional third party information sources for processing the profile to determine availability. For example, the communication management system can interface with network resources, such as calendaring applications or interfaces, to receive user calendaring information for an identified period of time. In this example, the calendaring information may be applied to a profile indicating communication channel availability based on categories of appointments (e.g., unavailability for a communication channel based on meetings with a "High Priority" label). Additionally, the calendaring information may be utilized by the communication management system in the selection of communication mitigation options.

Figure 16:
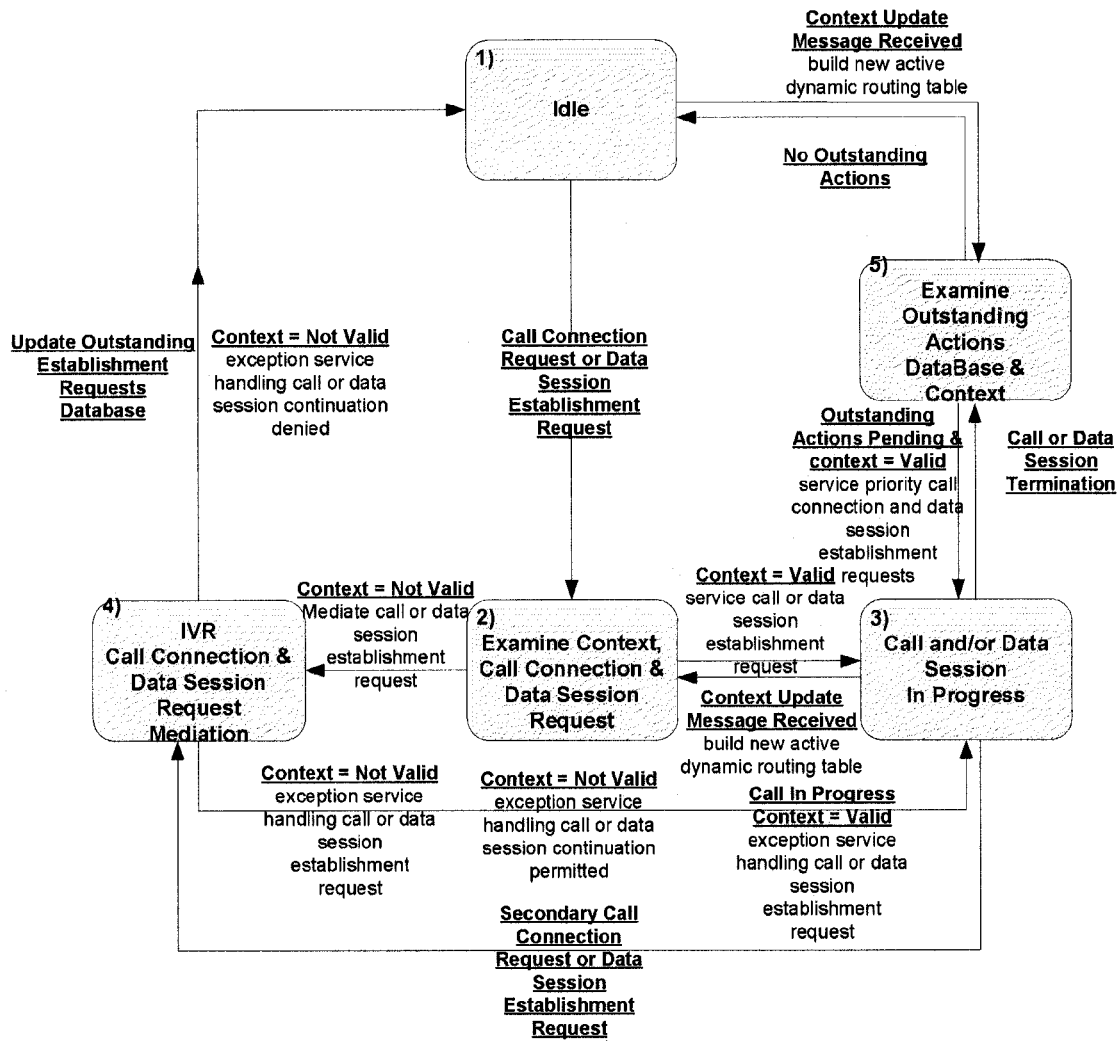
FIG. 16 is a block diagram illustrative of communication channel session state diagram implemented by a communication management component for managing communication channels.

At block 1508, the mobile service provider communication component 208 obtains a notification of a request to establish a communication channel. The notification can include a request to provide authorization for establishing the requested communication channel. Alternatively, the notification can include an indication that the communication channel will be initiated by default unless the communication management system 102 provides an indication that the communication channel should not be established. Additionally, the request to initiate the communication can include additional information regarding the identity or properties of the other party to the requested communication channel and that can be utilized to determine establish appointments for the user of the mobile device. FIG. 16 is a block diagram illustrative of communication channel session state diagram implemented by a communication management component for managing communication channel requested.

Returning to FIG. 15, at decision block 1510, the communication processing component 204 performs a test to determine whether the mobile communication device is available. In an illustrative embodiment, if the communication processing component 204 has utilized a profile that is applicable to all users, the device availability may be quickly determined based on the prior processing. If, however, the mobile communication device profiles specifies availability based on the identity of some third parties, the communication processing component 204 looks up the specific availability of the user or groups of users.

To facilitate the processing of availability information according to an identified user or groups of users, the communication processing component 204 can utilize a fast lookup routing table that sorts availability by the user's identity, such as phone number or IP address. In this embodiment, the data is sorted by number. As the communication processing component 204 selects a first identifier in the identity, such as the first digit of the phone number, any entries in the table not having the matching numbers collapse. This process would continue for each additional digit that is provided. One skilled in the relevant art will appreciate that individual users may be represented by full identities. Additionally, the routing table may also limit the number of identifiers (e.g., digits) as necessary to distinguish one user from another. For example, if the routing table has four users that have a matching area code and that have different third digits in their phone numbers, the routine table may limit entries to the area code and the first three digits and need not enter the entire area code. Likewise, for groups of users (such as an office), the entries for the entire group may be limited to the identifying information from the organization (such as the first set of digits from an IP address).

With continuing reference to FIG. 15, if the mobile communication device 104 has been determined to be available, at block 1512, the mobile service provider communication component 208 transmits an authorization to the mobile switching center 108. In the event that the routine 1500 is being implemented for an existing communication channel, block 1512, may be omitted. The routine 1500 returns to block 1502.

Alternatively, if it has been determined that mobile communication device 104 is not available, at block 1514, the mobile service provider communication component 208 transmits a rejection or termination message to the mobile switching center 108. In an illustrative embodiment, the rejection notice may have an immediate effect that prevents the establishment of a communication channel. In another embodiment, the termination notice may include a time to allow for a time period of continued communication prior to termination. The communication processing component 204 may select the time period according to the context information and the immediacy of the determined need for termination. At block 1516, the communication processing component 206 processes the communication mitigation and the routine 1500 returns to block 1502.

Communication Mitigation

In an illustrative embodiment, the communication mitigation for a rejected or terminated communication channel can be specified in a mobile communication device profile. As discussed above, the profile may be described with regard to all users, groups of users and/or specific users. In an illustrative embodiment, the communication mitigations can include immediate alternative communication channels/methods, such as a redirection to a voicemail system, a text to speech message processing system, the launching of an SMS service or email service, a redirection to an identified backup caller (such as an operator or an assistant), and the like.

In another embodiment, the communication mitigation corresponds to delayed mitigation techniques that reestablish the requested or existing communication channel upon a determined availability. For example, the user of the mobile device 104 or the third party communication device 112 can request a callback or new communication channel upon a change of mobile device context that results in the availability of the mobile communication device. The request can include a time component or other information for specifying the expiration of the request or availability for the requested callback. Additionally, the request can include additional information such as calendaring information for scheduling the requested communication channel. Additionally, the calendaring information may be utilized to select which communication mitigation technique may be available.

In still a further embodiment, the communication mitigation techniques can include the specification of immediate actions to be taken by the communication management system 102. In one example, a user of the mobile communication device 102 can request an override of the determined unavailability of the mobile device. In another example, a third party associated with the communication device 112 can request a page channel to the user of the mobile device 104 to request an override. In a further example, a third party associated with the communication device 112 can request an emergency breakthrough to establish the requested communication channel with the mobile communication device. In still a further example, either the user associated with the mobile communication device 104 or the third party user associated with the communication device 112 can request from several predefined messages to be played to the other users (such as a predetermined message requesting a driver to pull over to be able to take a call). In still a further embodiment, the communication processing component 204 may initiate a timer or counter that specifies a time limit for the user of the mobile device 104 to change the environment prior to the termination of an established communication channel or to allow for the initiation of the established communication channel.

In yet another embodiment of communication channel mitigation techniques, the communication processing component 204 can implement additional notifications to the parties requesting the communication channel or involved in an existing communication channel. The notification can include a specification of the available alternative mitigation options (described above), an explanation of why the communication channel was not authorized or is to be terminated and/or details regarding the timing for the termination of an existing communication channel. For example, when the communication management system 102 routes an incoming call to voicemail as the result of unavailability (e.g., the callee's mobile device is in an "in transit/city" context), an outgoing message may be played to the third party communication device 112. Different messages (which may but need not be prerecorded by the callee) may be played or generated depending upon whether the context is "in transit/city," "in-transit/highway," "in meeting," "in geospatial zone," "on the phone," etc. Further, the communication management system 102 may output an auto-generated audible message to the caller with information about the expected or estimated future availability of the mobile communication device user. For instance, if imported calendar information indicates that the mobile communication device user is in a meeting, the mitigation component 206 may output an audible message indicating (1) the scheduled end time of, or number of minutes remaining in, the meeting, and (2) the amount of free time until the next meeting. As another example, if the mobile communication device user is in a geospatial zone, the auto-generated message may indicate an estimated amount of time until the mobile communication device is predicted to exit the geospatial zone. The mobile communication device 104 may generate such estimates automatically while in a geospatial zone as part of the context assessment algorithm, and/or may periodically communicate such estimates (or significant changes thereto) to the communication management system 102.

Provisioning of Mobile Communication Device Profiles

Figure 17:
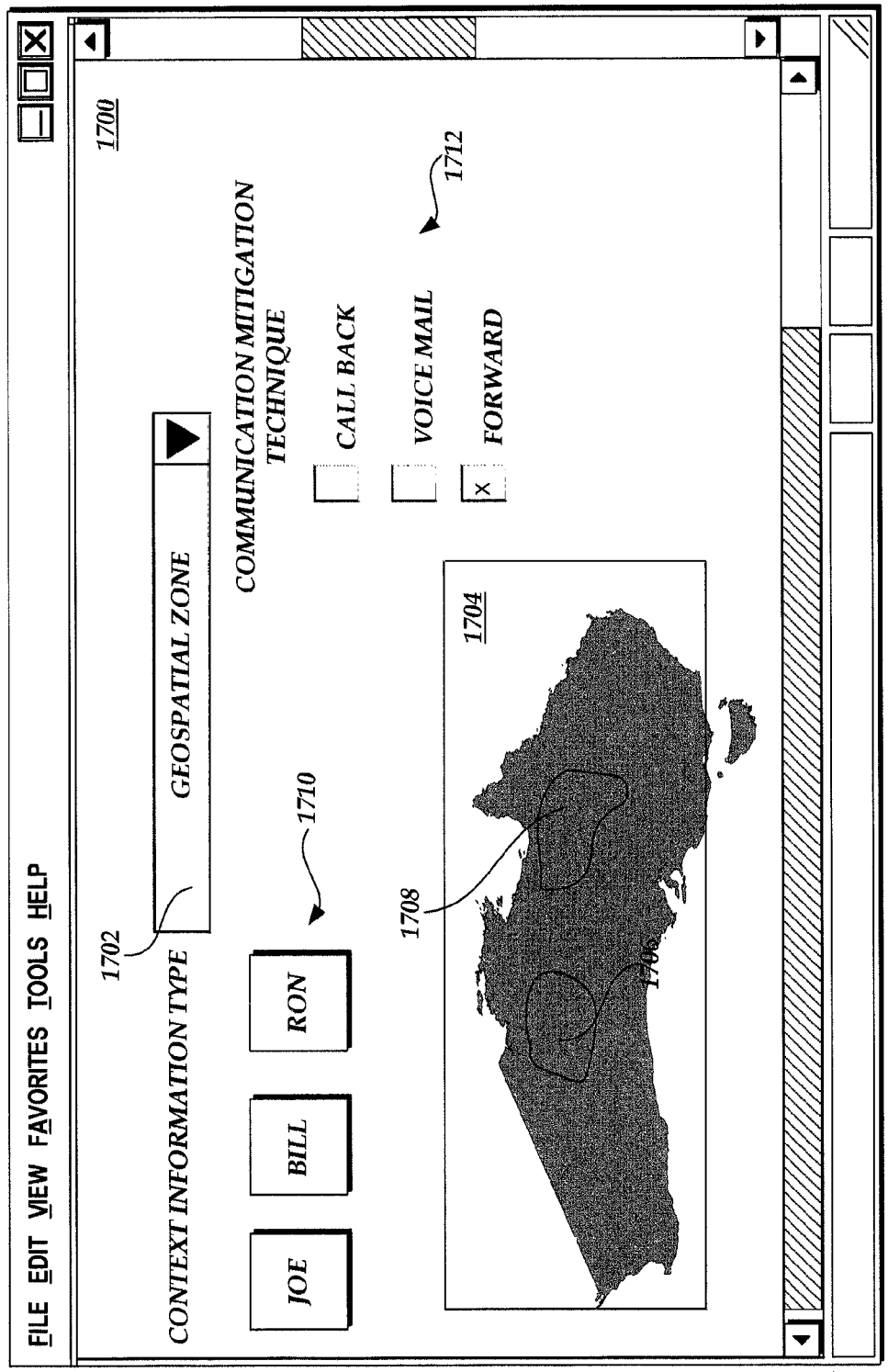
FIG. 17 is a block diagram illustrative of a screen display of a user interface for obtaining mobile communication device profile information for managing mobile communication device availability based on mobile communication device context information.

With reference now to FIG. 17, an illustrative screen display 1700 indicative of a user interface for provisioning mobile communication device profiles will be described. In an illustrative embodiment, the screen display 1700 may be generated by the mobile communication device 104 or a user at a computing device 116. The provisioning may correspond to administrator level policies set forth by enterprises, service provider or authorities. Additionally, the provisioning may correspond to policies set forth by additional identified users, such as parents. One skilled in the relevant art will appreciate that any number of interfaces may be generated. Additionally, various interfaces may be configured to correspond to the display capabilities and/or requirements of the device generating the display. Additionally, various interfaces may be presented according to the defined context.

With reference to FIG. 17, the screen display 1700 can include a first section 1702 for specifying a profile for particular type of context information. As illustrated in FIG. 17, the section 1702 specifies that availability information is being defined for one or more geospatial zones. The section 1702 may correspond to a number of available context information categories, such as a pick list or a drop down box. As also illustrated in FIG. 17, the screen display can include a map overlay section 1704 for provisioning the boundaries of the geospatial zone. The overlay section can correspond to map information published by the communication management system 172 or additional third parties. For example, the overlay section 1704 may be an existing street map that includes icons indicative of well known or specified establishments. In an illustrative embodiment, the geospatial zones may default to a selection of communication unavailability within the geospatial zone. Alternatively, a user may be able to specify the availability for the geospatial region based on context information or specific users or groups of users.

The screen interface 1700 can further include any number of graphic indicators of geospatial zones 1706, 1708 that will define the boundaries of the geospatial zones. In an illustrative embodiment, the graphic indicators may be generated via various drawing tools provided on the interface 1700. In another embodiment, the graphic indicators may be generated by the indication of the coordinates of endpoints and intersections of the boundaries. In still a further embodiment, the interface 1700 may be provisioned with predefined geospatial boundaries that have been provided by the communication management system 102 and/or published by other users.

In another embodiment, the geospatial boundaries can be generated by the entry of location coordinates by the user via a mobile device 104. In this embodiment, a user can utilize location information, such as GPS information, to indicate the coordinates of geospatial boundaries when the mobile device is at the coordinates. For example, the user can select a control or provide data via the mobile device to indicate the location of the boundaries.

With continued reference to FIG. 17, as previously described, the profile information may also be specified for specific users or groups of users. In accordance with an alternative embodiment, the screen interface can include a representation of users or individuals as a set of icons 1717 that can be manipulated to selection the application of a geospatial zone and selected availability. For example, a user can manipulate the icons 1710 via a drag and drop technique to apply a geospatial boundary and associated availability by dropping the icon on the selected geospatial zone or vice versa. The screen interface 1700 may also include a section 1712 in which a user can specify a type of communication mitigation technique to be applied in the event of unavailability. As illustrated in FIG. 17, a communication forward mitigation technique has been specified.

Figure 18:
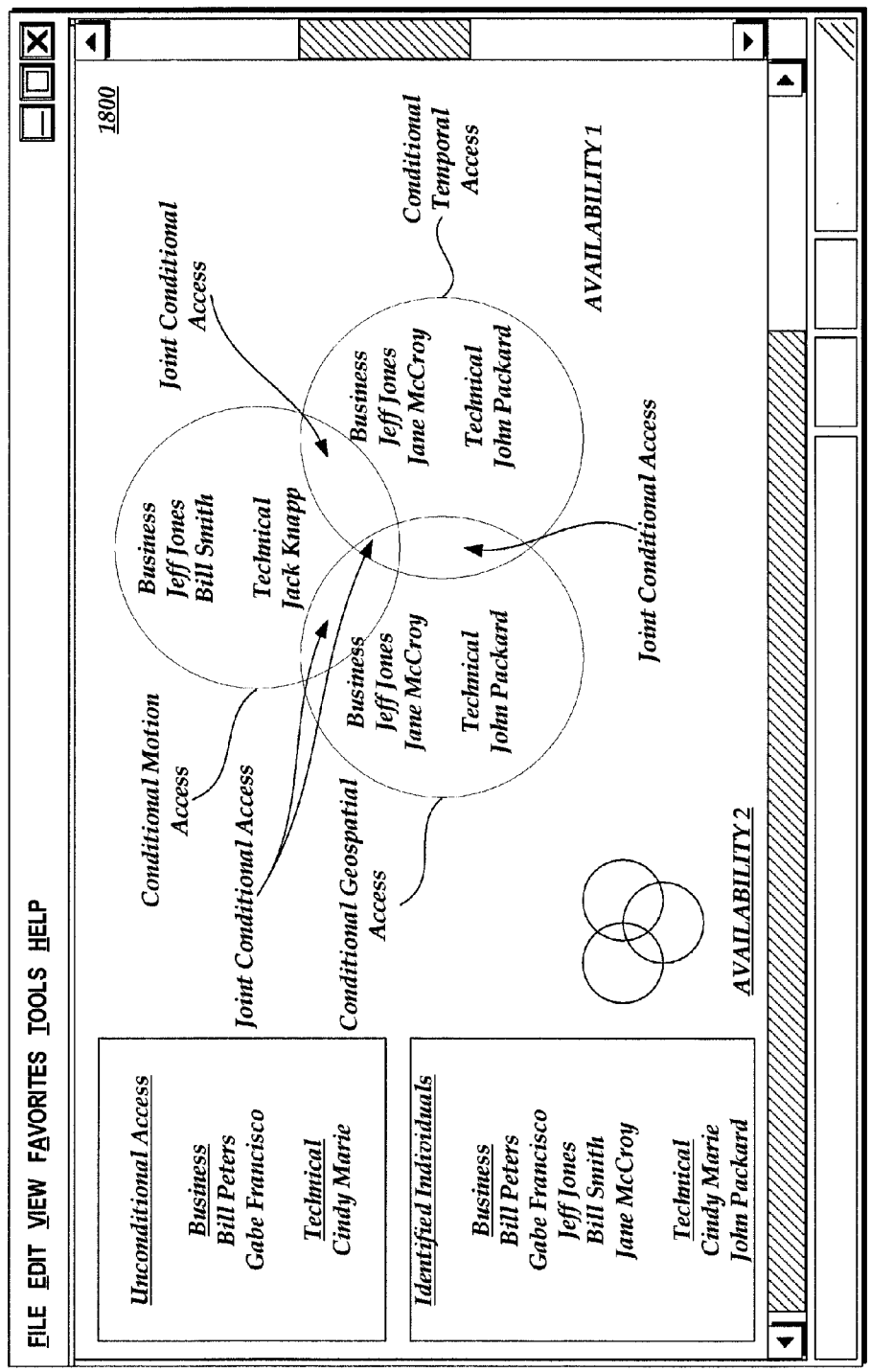
FIG. 18 is a block diagram illustrative of a screen display of a user interface for obtaining mobile communication device profile information for managing mobile communication device availability based on mobile communication device context information.

FIG. 18 is a block diagram illustrative of a screen display 1800 of a user interface for obtaining mobile communication device profile information for managing mobile communication device availability based on mobile communication device context information. The screen display 1800 facilitates the specification and management of profiles for individuals or groups of individuals. As illustrated in FIG. 18, the screen display 1800 corresponds to a display of geometric shapes (e.g., circles) that correspond to determined availability based context information. Display objects corresponding to identified individuals can be placed in the geometric shapes to associate the identified individual with the determined availability. Information identified individuals may correspond to information obtained from a network resource, such as a contact list. The association is stored in the mobile device profiles. Additionally, summaries of the associations can be displayed in the screen display 1800.

Additional Embodiments

In accordance with still another illustrative embodiment, the communications management component 102 may utilize learned behaviors or predictive behaviors to provision the mobile communication device profiles and/or to determine the availability of the mobile communication device 104. In accordance with this embodiment, communications manage component 102 may track various behaviors or mobile communication device usage in the mobile communications device profile data store 210. For example, the communications management component 102 may track the length of audio conversations between specific users or groups of users. In another example, the communications management component 102 may also track the timing of requests for communication channels on a daily, weekly or monthly basis. In still a further example, the communication management system 102 may track previous determined unavailability to generate a model of availability for users based on time of day or based on events. With continued reference to the example, the communications management component 102 may associate events on a calendar (such as specific reoccurring meetings) with mobile communication device context information that generates a determination of unavailability (such as traveling within a defined geospatial zone). Accordingly, a profile may be provisioned such that the communication processing component 204 may utilize user calendaring function inputs to determine unavailability in advance. Additionally, users may be asked to identify specific, or notable events, that facilitate the learned behavior approach.

In a related embodiment, the communication processing component 204 may also utilize learned behavior to adjust a determination of availability. For example, assume that an identified user typically has audio communications with another user for 20 minutes or greater on a frequent basis. Also assume that at current time, the mobile device is available for audio communication channels. However, the current bearing and velocity will likely place the mobile communication device 104 within a geospatial zone defining unavailability in the next 10 minutes of travel.

In this embodiment, the communication processing component 204 can include learned behaviors to determine whether it would have to likely terminate the communications channel. If so, the communication processing component 204 may adjust the determination of availability in the event that the anticipated time of the communication channel cannot be completed. Thus, in the above example, the communication processing component 204 can determine that the user will likely be entering a geospatial zone based on a current velocity and bearing. Additionally, because of learned behaviors or historical knowledge, the communication processing component 204 can anticipate that the length of the audio communication and will require the communication channel to be terminated when the mobile communications device enters the geospatial zone. Accordingly, the communication processing component 204 may choose, based on its own configurations or a configuration specified by the user, to not authorize the communications channel and offer a selection of communication mitigation approaches.

In another example, the communication processing component 204 can monitor a user's repeated selection of communication mitigation techniques as part of an interactive voice response as a function of an identified user or a specific mobile device context. Accordingly, the communication processing component 204 may update applicable mobile communication device profiles in view of a number of predetermined selections of communication mitigation techniques.

In still another example, the communication processing component 204 can monitor a determination of repeated unavailability according to a time of day or other identified event. Accordingly, the communication processing component 204 may update applicable mobile communication device profiles in view of a number of determinations such that a profile can specify automatically specify unavailability as a function of the determined time of day or event. For example, if a mobile communication device 104 is determined to be unavailable every for two consecutive weeks at the same time, the communication processing component 204 may update a profile to make the unavailability determine a function of time.

In yet a further example, communication processing component 204 can monitor a number of communication requests from a previously unidentified third party communication device 112 or for a communication device that is not associated with a mobile communication device profile. After a number of repeated communication requests, the communication processing component 204 may automatically create a mobile communication device profile or prompt a user for the creation of the mobile communication device profile for such third party communication device. The communication processing component 204 can automatically populate some or all of the aspects of the profile based on the previously monitored activity. Additionally, it can import a template of profile information set by the user, an administrator or a service provider.

In accordance with another embodiment, the context information and/or availability generated by the mobile communication device 104 or the communications management component 102 may be published to additional information sources/repositories, such as network resources. In one example, the mobile device 104 or communications management component 102 may publish a set of the geospatial zones that a user has created. The published geospatial zones may be used by other system users to provision mobile communication device profiles. The published geospatial zones may be utilized to describe/publish the context information that will be used by the communications management component 102 to determine availability.

In another embodiment, the mobile communication device context information may be published to other information sources/repositories to publish the current or past mobile device contexts. In one example, the mobile device context information can be linked with a personal Web page of a user, such that context information (e.g., in transit) is published on the Web page. In another example, the mobile device context information can be linked with a calendaring function to determine whether the user is on schedule. If for example a user remains in a city/urban transit state due to traffic conditions, subsequent appointments may need to be rescheduled or cancelled. Accordingly, a control algorithm may automatically cancel meetings or provide appropriate notifications. In still another embodiment, the determination of a proximity to a geospatial zone or entry into a geospatial zone may be published to a third party source to initiate additional actions (e.g., a communication to security personnel).

In still another embodiment, the mobile communication device availability information may also be published to other information sources/repositories. Similar to the published context information, the mobile device availability information can be linked with a personal Web page of a user, such that availability information (e.g., in transit) is published on the Web page. In another example, the mobile device availability information can be linked with a calendaring function and published to allow for scheduling of current or future events. In still a further example, the published availability information (historical and current) may be used to generate and published a model of availability. In such an embodiment, other users may be presented with opportunities for predictive availability. Still further, the availability information may be filtered according to the authorization to different users or classes of users.

Messaging Formats

Although not limiting, the Tables 1-5 define illustrative messaging formats that could be utilized by the mobile communication device 104 and the communications management component 102 to exchange data. The message formats facilitate communications in a variable sized data communication protocol. One skilled in the relevant art will appreciate, however, that alternative or modified messaging formats may be utilized in accordance with the teachings in the present disclosure. Thus, the disclosed messaging formats are illustrative in nature and should not be construed as limiting.

TABLE 1

Current Context Message

| 7 MSB | 6 | 5 | 4 | 3 | 2 | 1 | 0 LSB | Description I | Description II |
|---|---|---|---|---|---|---|---|---|---|
| PDU 1 | | | | | | | | Protocol Data Unit | Identifier |
| Telephone no (0) | | | | | | | 1 | Identification | |
| Telephone no (1) | | | | | | | 0 | Field | |
| IP Address (0) | | | | | | | 1 | | |
| IP Address (1) | | | | | | | 1 | | |
| IP Address (2) | | | | | | | 1 | | |
| IP Address (3) | | | | | | | 0 | | |
| System ID (0) | | | | | | | 1 | | |
| System ID (1) | | | | | | | 0 | | |
| Context Field Identifier | | | | | | | 1 | Context Header | Context |
| M/J | G | T | C | A | A | OR | 1 | context | And |
| M/J | G | T | C | A | A | OR | 0 | conformance | Conformance |
| M/J | G | T | C | A | A | OR | 1 | context | Field |
| M/J | G | T | C | A | A | OR | 0 | conformance | |
| Data Field Identifier | | | | | | | 1 | Data Header | Data |
| Latitude (0) | | | | | | | 1 | Location | Field |
| Latitude (3) | | | | | | | 0 | data | |
| Longitude (0) | | | | | | | 1 | | |
| Longitude (1) | | | | | | | 0 | | |
| Altitude (0) | | | | | | | 1 | Motion | |
| Velocity (0) | | | | | | | 0 | Data | |
| Time (0) | | | | | | | 1 | Date | |
| Date (0) | | | | | | | 0 | Data | |
| Message ID Identifier | | | | | | | 1 | | Message |
| Message No | | | | | | 0 | 0 | | Management |

TABLE 2

Current Parameters Message

| 7 MSB | 6 | 5 | 4 | 3 | 2 | 1 | 0 LSB | Description I | Description II |
|---|---|---|---|---|---|---|---|---|---|
| PDU 2 | | | | | | | | Protocol Data Unit | Identifier |
| Telephone no (0) | | | | | | | 1 | Identification | |
| Telephone no (1) | | | | | | | 0 | Field | |
| IP Address (0) | | | | | | | 1 | | |
| IP Address (1) | | | | | | | 1 | | |

TABLE 2-continued

Current Parameters Message

| 7 MSB | 6 | 5 | 4 | 3 | 2 | 1 | 0 LSB | Description I | Description II |
|---|---|---|---|---|---|---|---|---|---|
| | | IP Address (2) | | | | | 1 | | |
| | | IP Address (3) | | | | | 0 | | |
| | | Aegis ID(0) | | | | | 1 | | |
| | | Aegis ID(1) | | | | | 0 | | |
| | Parameter Field Identifier | | | | | | 1 | Parameter Fields | |
| | Parameter 1 (0) | | | | | | 1 | | |
| | Parameter 1 (3) | | | | | | 0 | | |
| | Parameter 1 (0) | | | | | | 1 | | |
| | Parameter 2 (1) | | | | | | 0 | | |
| | Parameter 2 (0) | | | | | | 1 | | |
| | Parameter 3(0) | | | | | | 0 | | |
| | Parameter 4 (0) | | | | | | 1 | | |
| | Parameter 5 (0) | | | | | | 0 | | |
| | Message ID Identifier | | | | | | 1 | Message Management | |
| | Message No | | | | | 0 | 1 | | |

TABLE 3

Message Acknowledgment

| 7 MSB | 6 | 5 | 4 | 3 | 2 | 1 | 0 LSB | Description I | Description II |
|---|---|---|---|---|---|---|---|---|---|
| | | PDU 3 | | | | | | Protocol Data Unit Identifier | |
| | | Telephone no (0) | | | | | 1 | Identification Field | |
| | | Telephone no (1) | | | | | 0 | | |
| | | IP Address (0) | | | | | 1 | | |
| | | IP Address (1) | | | | | 1 | | |
| | | IP Address (2) | | | | | 1 | | |
| | | IP Address (3) | | | | | 0 | | |
| | | Aegis ID(0) | | | | | 1 | | |
| | | Aegis ID(1) | | | | | 0 | | |
| | Message ID Identifier | | | | | | 1 | Message Management | |
| | Message No | | | | | 1 | 0 | | |

TABLE 4

Message Affirm/Response

| 7 MSB | 6 | 5 | 4 | 3 | 2 | 1 | 0 LSB | Description I | Description II |
|---|---|---|---|---|---|---|---|---|---|
| | | PDU 4 | | | | | | Protocol Data Unit Identifier | |
| | | Telephone no (0) | | | | | 1 | Identification Field | |
| | | Telephone no (1) | | | | | 0 | | |
| | | IP Address (0) | | | | | 1 | | |
| | | IP Address (1) | | | | | 1 | | |
| | | IP Address (2) | | | | | 1 | | |
| | | IP Address (3) | | | | | 0 | | |
| | | Aegis ID(0) | | | | | 1 | | |
| | | Aegis ID(1) | | | | | 0 | | |

TABLE 5

Generic Control Plane Context Management Protocol for Geo Fence Definition

| 7 MSB | 6 | 5 | 4 | 3 | 2 | 1 | 0 LSB | Description I | Description II |
|---|---|---|---|---|---|---|---|---|---|
| | | PDU 2 | | | | | | Protocol Data Unit Identifier | |
| | | Telephone no (0) | | | | | 1 | Identification Field | |
| | | Telephone no (1) | | | | | 0 | | |

TABLE 5-continued

Generic Control Plane Context Management Protocol for Geo Fence Definition

| 7 MSB | 6 | 5 | 4 | 3 | 2 | 1 | 0 LSB | Description I | Description II |
|---|---|---|---|---|---|---|---|---|---|
| | | | IP Address (0) | | | | 1 | | |
| | | | IP Address (1) | | | | 1 | | |
| | | | IP Address (2) | | | | 1 | | |
| | | | IP Address (3) | | | | 0 | | |
| | | | Aegis ID(0) | | | | 1 | | |
| | | | Aegis ID(1) | | | | 0 | | |
| | | | Geo Fence Identifier | | | | 1 | | Parameter Fields |
| | | | Latitude (0) | | | | 1 | | |
| | | | Latitude (3) | | | | 0 | | |
| | | | Longitude (0) | | | | 1 | | |
| | | | Longitude (3) | | | | 0 | | |
| | | | Maximum Radius | | | | 1 | | |
| | | | Minimum Radius | | | | 1 | | |
| | | | Bearing 1 | | | | 0 | | |
| | | | Radii | | | | 1 | | |
| | | | Bearing 2 | | | | 0 | | |
| | | | Radii | | | | 1 | | |
| | | | Bearing | | | | 0 | | |
| | | | : | | | | : | | |
| | | | Bearing N | | | | 0 | | |
| | | | Radii | | | | 1 | | |
| | | | Message ID Identifier | | | | 1 | | Message Management |
| | | | Message No | | | 0 | 1 | | |

Illustrative Application

Although not limiting, the Tables 6-10 define illustrative communication management and interaction by the various components of the communication management environment 200. One skilled in the relevant art will appreciate, however, that the present disclosure is in no way limited to the described applications and that alternative applications may be provided in accordance with the teachings in the present disclosure. Thus, the disclosed applications are illustrative in nature and should not be construed as limiting.

TABLE 6

Usage Case Processing

| Time | Third Party Communication Device 112 | MSC 108 | | Mitigation Component 103 | Mobile Communication Device 104 |
|---|---|---|---|---|---|
| | | | | Communication Management Component 102 | |
| Starting Status | | | | Current context = unconditional Communication Management Server 102 Server | |
| Context Change Event | | | | Stop; step 2 Current context = conditional Conditions = mediated | Start; step 1 Context specific behavior detected and confirmed Context = F(driving, location, time of day, calendar, user engaged privacy) send context update message to Communication Management Server 102 Server |
| | | | | Communication Management Component 102 | |
| Basic Call Handling | Start; step 1 External call to client initiated | Step 2 MSC 108 receives call establishment request and sends routing request query to | | Step3 Communication Management Component 102 responds and informs the | Step 4 IVR sequence informs caller that the mobile user is currently unavailable and the |

TABLE 6-continued

Usage Case Processing

| Time | Third Party Communication Device 112 | MSC 108 | Communication Management Component 102 | Mitigation Component 103 | Mobile Communication Device 104 |
|---|---|---|---|---|---|
| | | | Communication Management Component 102 | MSC 108 that the call should be routed to the Mitigation Component 103 for call mediation since current context = conditional conditions = mediation | following options are available 1. Voice mail 2. Automated call back upon when mobile available 3. Page to request call acceptance 4. immediate emergency call establishment |
| Context Change Event | | | | Step 9 Current context = conditional Conditions = unconditional | Step 8 Cessation of driving behavior detected and confirmed send context update message to Communication Management Component 102 |

TABLE 7

Network Originated Driving Usage Cases

| Time | Third Party Communication Device 112 | MSC 108 | Communication Management Component 102 | Mitigation Component 103 | Mobile Communication Device 104 |
|---|---|---|---|---|---|
| Starting Status | | | Current context = unconditional | | |
| Context Change Event | | | Stop; step 2 Current context = conditional Conditions = driving | | Start; step 1 Driving behavior detected and confirmed send context update message to Communication Management Component 102 |
| Basic Call Handling | Start; step 1 External call to client initiated | Step 2 MSC 108 receives call establishment request and sends routing request query to Communication Management Component 102 | Step3 Communication Management Component 102 responds and informs the call should be routed to the Mitigation Component 103 for call mediation since current context = conditional conditions = driving | Step 4 IVR sequence informs caller that the mobile user is driving and the following options are available 5. Voice mail 6. Automated call back upon at journey end 7. Page driver to pull over to take the call 8. immediate emergency call establishment | |
| | Step 5 Third Party Communication Device 112 requests voice mail | | | Stop; Step 6 Call terminated via voice mail and caller informed of mobiles driving status | |
| Basic Call Handling | Start; step 1 External call to client initiated | Step 2 MSC 108 receives call establishment request and sends routing request query to | Step3 Communication Management Component 102 responds and informs the call | Step 4 IVR sequence informs caller that the mobile user is driving and the following options are | |

TABLE 7-continued

Network Originated Driving Usage Cases

| Time | Third Party Communication Device 112 | MSC 108 | Communication Management Component 102 | Mitigation Component 103 | Mobile Communication Device 104 |
|---|---|---|---|---|---|
| | | | Communication Management Component 102 should be routed to the Mitigation Component 103 for call mediation since current context = conditional conditions = driving | available<br>9. Voice mail<br>10. Automated call back upon at journey end<br>11. Page driver to pull over to take the call<br>12. Immediate emergency call establishment | |
| | Step 5<br>Third Party Communication Device 112 requests automated call back upon journey termination | | Step 7<br>Aegis server queues pending call request | Step 6<br>Call terminated via IVR<br>caller informed of mobiles driving status<br>callers call back request acknowledged<br>call back request sent to Communication Management Component 102 | |
| Context Change Event | | | Step 9<br>Current context = conditional<br>Conditions = unconditional | | Step 8<br>Cessation of driving behavior detected and confirmed<br>send context update message to Communication Management Component 102 |
| | Stop; step 11<br>Caller connected to mobile | | Step 10<br>Communication Management Component 102 initiates bi-lateral call establishment request to mobile and originating caller Id | | Stop; step 11<br>Mobile connected to caller |
| Basic Call Handling | Start; step 1<br>External call to client initiated | Step 2<br>MSC 108 receives call establishment request and sends routing request query to Communication Management Component 102 | Step3<br>Communication Management Component 102 responds and informs the call should be routed to the Mitigation Component 103 for call mediation since current context = conditional conditions = driving | Step 4<br>IVR sequence informs caller that the mobile user is driving and the following options are available<br>13. Voice mail<br>14. Automated call back upon at journey end<br>15. Page driver to pull over to take the call<br>16. Immediate emergency call establishment | |
| | Step 5<br>Third Party Communication Device 112 requests page to request driver to pull over | | Step 7<br>Aegis server sends pull over page request to Mobile Communication Device 104 | Step 6<br>Call establishment request is placed on hold, caller informed pull over request is in progress<br>Pull over page request sent to Communication | Step 8<br>Mobile Communication Device 104 rings in unique manner (ring tone) to identify driving pull over request and call |

TABLE 7-continued

Network Originated Driving Usage Cases

| Time | Third Party Communication Device 112 | MSC 108 | Communication Management Component 102 | Mitigation Component 103 | Mobile Communication Device 104 |
|---|---|---|---|---|---|
| | | | Management Component 102 | | on hold |
| Context Change Event | | | Step 10 Current context = conditional Conditions = unconditional | | Step 9 Cessation of driving behavior detected and confirmed send context update message to Communication Management Component 102 |
| | Stop; step 12 Caller connected to mobile | | Step 11 Communication Management Component 102 completes pending call establishment request to mobile from originating caller Id | | Stop; step 12 Mobile connected to caller |
| Basic Call Handling | Start; step 1 External call to client initiated | Step 2 MSC 108 receives call establishment request and sends routing request query to Communication Management Component 102 | Step3 Communication Management Component 102 responds and informs the call should be routed to the Mitigation Component 103 for call mediation since current context = conditional conditions = driving | Step 4 IVR sequence informs caller that the mobile user is driving and the following options are available 17. Voice mail 18. Automated call back upon at journey end 19. Page driver to pull over to take the call 20. Immediate emergency call establishment | |
| | Step 5 Third Party Communication Device 112 requests immediate emergency call establishment | | Step 7 Communication Management Component 102 completes pending call establishment request to mobile from originating caller Id | Step 6 Call establishment request is placed on hold Immediate cal establishment request sent to Communication Management Component 102 | Step 8 Mobile Communication Device 104 rings in unique manner (ring tone) to identify emergency connection request and call on hold |
| | Stop; step 10 Caller connected to mobile | | Step 9 Current context = conditional Conditions = conditional Conformance = non compliant | | Stop; step 10 Mobile connected to caller |

TABLE 8

Mobile Communication Device 104 Orientated Driving Usage Cases

| Time | Third Party Communication Device 112 | MSC 108 | Communication Management Component 102 | Mitigation Component 103 | Mobile Communication Device 104 |
|---|---|---|---|---|---|
| Starting Status | | | Current context = unconditional | | |
| | Step 3 Called party terminates and establishes call | Step 2 MSC 108 routes call establishment request | Step 4 Communication Management Component 102 records Current context = unconditional & call in progress | | Start; step 1 Mobile Communication Device 104 initiates call establishment request |
| Context Change Event | | | Step 6 Current context = conditional Conditions = driving & call in progress Conformance = non compliant | | Step 5 Driving behavior detected and confirmed send context update message to Communication Management Component 102 |
| Basic Call Handling | Step 8, stop Call cessation request received from Communication Management Component 102 | | Step 7 Communication Management Component 102 responds and injects audio driving notification into call pathway for both parties Request voluntary call termination Conditions = driving & call in progress Conformance = non compliant Compliance timer set for max call duration | | Step 8, stop Call cessation request received from Communication Management Component 102 |
| Optional Call Handling | Step 10, stop Audio call termination received Call terminates | | Step 9, Optional Compliance timer expires Communication Management Component 102 injects audio call termination pending warning Communication Management Component 102 terminates call between Mobile Communication Device 104 and caller | | Step 10, stop Audio call termination received Call terminates |

TABLE 9

Geospatial Usage Cases

| Time | Third Party Communication Device 112 | MSC 108 | Communication Management Component 102 | Mitigation Component 103 | Mobile Communication Device 104 |
|---|---|---|---|---|---|
| Starting Status | | | Current context = unconditional | | |
| Context Change Event | | | Stop; step 2 Current context = conditional Conditions = geo zone | | Start; step 1 Geo-Zone detected and confirmed that Mobile Communication Device 104 is contained |

TABLE 9-continued

Geospatial Usage Cases

| Time | Third Party Communication Device 112 | MSC 108 | Communication Management Component 102 | Mitigation Component 103 | Mobile Communication Device 104 |
|---|---|---|---|---|---|
| | | | | | within a defined geo zone send context update message to Communication Management Component 102 |
| Basic Call Handling | Start; step 1 External call to client initiated | Step 2 MSC 108 receives call establishment request and sends routing request query to Communication Management Component 102 | Step3 Communication Management Component 102 examines the caller ID to determine if the call can be immediately connected or if the call should be mediated If mediation is selected the Communication Management Component 102 routes the call establishment request call to the Mitigation Component 103 current context = conditional conditions = geo zone | Step 4 IVR sequence informs caller that the mobile user is currently unavailable and the following options are available 1. Voice mail 2. Automated call back upon exit from geo-zone 3. Immediate emergency call establishment | |
| | Step 5 Third Party Communication Device 112 requests voice mail | | | Stop; Step 6 Call terminated via voice mail and caller informed of mobiles unavailable status | |
| Basic Call Handling | Start; step 1 External call to client initiated | Step 2 MSC 108 receives call establishment request and sends routing request query to Communication Management Component 102 | Step3 Communication Management Component 102 examines caller ID to determine if the call can be immediately connected or if the call should be mediated If mediation is required the Communication Management Component 102 routes the call establishment request call to the Mitigation Component 103 current context = conditional conditions = geo zone | Step 4 IVR sequence informs caller that the mobile user is driving and the following options are available 1) Voice mail 2) Automated call back exit from geo zone 3) Immediate emergency call establishment | |
| | Step 5 Third Party Communication Device 112 requests automated call back mobile availability | | Step 7 Aegis server queues pending call request | Step 6 Call terminated via IVR caller informed of mobiles clients location limitations status | |

TABLE 9-continued

Geospatial Usage Cases

| Time | Third Party Communication Device 112 | MSC 108 | Communication Management Component 102 | Mitigation Component 103 | Mobile Communication Device 104 |
|---|---|---|---|---|---|
| | | | callers call back request acknowledged call back request sent to Communication Management Component 102 | | |
| Context Change Event | | | Step 9 Current context = conditional Conditions = unconditional | | Step 8 Geo-zone vacated, event detected and confirmed send context update message to Communication Management Component 102 |
| | Stop; step 11 Caller connected to mobile | | Step 10 Communication Management Component 102 initiates bi-lateral call establishment request to mobile and originating caller Id | | Stop; step 11 Mobile connected to caller |
| Basic Call Handling | Start; step 1 External call to client initiated | Step 2 MSC 108 receives call establishment request and sends routing request query to Communication Management Component 102 | Step 3 Communication Management Component 102 examines the caller ID to determine if the call can be immediately connected or if the call should be mediated If mediation is selected the Communication Management Component 102 routes the call establishment request call to the Mitigation Component 103 current context = conditional conditions = geo zone | Step 4 IVR sequence informs caller that the mobile user is unable to accept calls at the current location and the following options are available 1) Voice mail 2) Automated call back upon at journey end 3) Immediate emergency call establishment | |
| | Step 5 Third Party Communication Device 112 requests immediate emergency call establishment | | Step 7 Communication Management Component 102 completes pending call establishment request to mobile from originating caller Id | Step 6 Call establishment request is placed on hold Immediate call establishment request sent to Communication Management Component 102 | Step 8 Mobile Communication Device 104 rings in unique manner (ring tone) to identify connection request and call on hold |
| | Stop; step 10 Caller connected to mobile | | Step 9 Current context = conditional Conditions = conditional Conformance = non compliant | | Stop; step 10 Mobile connected to caller |

TABLE 10

| | | | Temporal & Calendar Meeting | | |
|---|---|---|---|---|---|
| Time | Third Party Communication Device 112 | MSC 108 | Communication Management Component 102 | Mitigation Component 103 | Mobile Communication Device 104 |
| Starting Status Context Change Event | | | Current context = unconditional Stop; step 2 Current context = conditional Conditions = Private time | | Start; step 1 Calendared meeting or private time zone detected send context update message to Communication Management Component 102 |
| Basic Call Handling | Start; step 1 External call to client initiated | Step 2 MSC 108 receives call establishment request and sends routing request query to Communication Management Component 102 | Step3 Communication Management Component 102 examines the caller ID to determine if the call can be immediately connected or if the call should be mediated If mediation is selected the Communication Management Component 102 routes the call establishment request call to the Mitigation Component 103 current context = conditional conditions = private time | Step 4 IVR sequence informs caller that the mobile user is currently unavailable and the following options are available 1. Voice mail 2. Automated call back upon availability 3. Immediate emergency call establishment | |
| | Step 5 Third Party Communication Device 112 requests voice mail | | | Stop; Step 6 Call terminated via voice mail and caller informed of mobiles unavailable status | |
| Basic Call Handling | Start; step 1 External call to client initiated | Step 2 MSC 108 receives call establishment request and sends routing request query to Communication Management Component 102 | Step3 Communication Management Component 102 examines caller ID to determine if the call can be immediately connected or if the call should be mediated If mediation is required the Communication Management Component 102 routes the call establishment request call to the Mitigation Component 103 current context = conditional conditions = private time | Step 4 IVR sequence informs caller that the mobile user is not available and the following options are available 1) Voice mail 2) Automated call back when mobile is available 3) Immediate emergency call establishment | |

TABLE 10-continued

Temporal & Calendar Meeting

| Time | Third Party Communication Device 112 | MSC 108 | Communication Management Component 102 | Mitigation Component 103 | Mobile Communication Device 104 |
|---|---|---|---|---|---|
| | Step 5<br>Third Party Communication Device 112 requests automated call back mobile availability | | Step 7<br>Aegis server queues pending call request | Step 6<br>Call terminated via IVR<br>caller informed of mobiles clients not available status<br>caller's call back request acknowledged<br>call back request sent to Communication Management Component 102 | |
| Context Change Event | | | Step 9<br>Current context = conditional<br>Conditions = unconditional | | Step 8<br>Private time finished, event detected and confirmed<br>send context update message to Communication Management Component 102 |
| | Stop; step 11<br>Caller connected to mobile | | Step 10<br>Communication Management Component 102 initiates bi-lateral call establishment request to mobile and originating caller Id | | Stop; step 11<br>Mobile connected to caller |
| Basic Call Handling | Start; step 1<br>External call to client initiated | Step 2<br>MSC 108 receives call establishment request and sends routing request query to Communication Management Component 102 | Step3<br>Communication Management Component 102 examines the caller ID to determine if the call can be immediately connected or if the call should be mediated<br>If mediation is selected the Communication Management Component 102 routes the call establishment request call to the Mitigation Component 103<br>current context = conditional<br>conditions = private time | Step 4<br>IVR sequence informs caller that the mobile user is unable to accept calls at this time and the following options are available<br>1) Voice mail<br>2) Automated call back upon at journey end<br>3) Immediate emergency call establishment | |
| | Step 5<br>Third Party Communication Device 112 requests immediate emergency call establishment | | Step 7<br>Communication Management Component 102 completes pending call establishment request to mobile from originating caller Id | Step 6<br>Call establishment request is placed on hold<br>Immediate call establishment request sent to Communication Management Component 102 | Step 8<br>Mobile Communication Device 104 rings in unique manner (ring tone) to identify connection request and call on hold |

TABLE 10-continued

Temporal & Calendar Meeting

| Time | Third Party Communication Device 112 | MSC 108 | Communication Management Component 102 | Mitigation Component 103 | Mobile Communication Device 104 |
|---|---|---|---|---|---|
| | Stop; step 10 Caller connected to mobile | | Step 9 Current context = conditional Conditions = conditional Conformance = non compliant | | Stop; step 10 Mobile connected to caller |

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A power-efficient method of assessing a context of a mobile device, the method comprising:

maintaining state data indicative of a current context of a mobile device, wherein the state data defines whether the mobile device is available to establish communication with a third party device;

determining, at the mobile device, a transition of the mobile device from the current context to an updated context, wherein the determination is based at least in part on information obtained by the mobile device during each interval of a set of intervals, wherein the obtained information is not transmitted from the mobile device, and wherein the set of intervals is based at least in part on an anticipated variance of the obtained information;

responsive to a determination of a transition:

modifying the state data based at least in part on the determined transition, wherein the state data is indicative of the updated context, and wherein modification of the state data occurs only in response to a determination of a transition, and modifying, without interaction with an external device, the set of intervals based at least in part on the updated context, wherein the modified set of intervals are defined by the updated context and correspond to an anticipated variance in information obtained during the updated context;

receiving a request to establish communication between the mobile device and the third party device, and managing the request to establish communication based at least in part on the state data.

2. The method of claim 1, wherein the obtained information is indicative of at least one of a velocity, a distance traveled, and a bearing associated with an environment of the mobile device.

3. The method of claim 1, wherein a context of the mobile device is at least one of a non-transitory context, an in-transit context, an urban transit context, a highway transit context, an in-flight transit context, a journey onset context, and a journey termination context.

4. The method of claim 3, wherein each potential context of the mobile device is associated with a set of criteria, each set of criteria corresponding to potential obtained information, and wherein determining a transition of the mobile device includes determining whether the obtained information satisfies the set of criteria associated with at least one of the potential contexts.

5. A non-transitory computer-readable medium having instructions encoded thereon for power-efficient assessment of a mobile device context, wherein the instructions, when executed by a processor, cause the processor to:

> maintain state data indicative of a current context of a mobile device, wherein the state data defines whether the mobile device is available to establish communication with a third party device;
>
> determine, at a mobile device, a transition of the mobile device from a current context to an updated context, wherein the determination is based at least in part on information obtained by the mobile device during each interval of a set of intervals, wherein the obtained information is not transmitted from the mobile device, and wherein the set of intervals is based at least in part on an anticipated variance of the obtained information; and
>
> responsive to the determined transition:
>> modify the state data based at least in part on the determined transition, wherein the state data is indicative of the updated context, and wherein modification of the state data occurs only in response to a determination of a transition, and
>>
>> modify, without interaction with an external device, the set of intervals based at least in part on the updated context, wherein the modified set of intervals are defined by the updated context and correspond to an anticipated variance in information obtained during the updated context;
>
> wherein requests to establish communication between the mobile device and the third party device are managed based at least in part on the updated context.

6. The non-transitory computer-readable medium of claim 5, wherein the instructions, when executed by the processor, further cause the processor, in response to the determined transition, to transmit a context change notification based on the determined transition.

7. The non-transitory computer-readable medium of claim 5, wherein each potential updated context of the mobile device is associated with a set of criteria, each set of criteria corresponding to potential information obtained from at least one sensor of the mobile device, and wherein the transition is determined based at least in part on a determination of whether the obtained information satisfies the set of criteria associated with at least one of the potential updated contexts.

8. The non-transitory computer-readable medium of claim 7, wherein at least one set of criteria includes criteria associated with a variance in potential information obtained from the at least one sensor.

9. The non-transitory computer-readable medium of claim 8, wherein at least one set of criteria includes criteria associated with at least one of an absolute variance and rate of variance change.

10. A computer-implemented system for power-efficient assessment of a mobile device context, comprising:

> one or more processors configured to:
>> determine, at a mobile device, a transition of the mobile device from a current context to an updated context defining whether the mobile device is available to establish communication with a third party device, wherein the determination is based at least in part on information obtained by the mobile device during each interval of a set of intervals, wherein the obtained information is not transmitted from the mobile device, and wherein the set of intervals is based at least in part on an anticipated variance of the obtained information; and
>>
>> responsive to the determined transition, modify, without interaction with an external device, the set of intervals based at least in part on the updated context, wherein the modified set of intervals are defined by the updated context and correspond to an anticipated variance in information obtained during the updated context;
>
> wherein requests to establish communication between the mobile device and the third party device are managed based at least in part on the updated context, wherein each potential updated context of the mobile device is associated with a set of criteria, each set of criteria corresponding to potential information obtained from at least one sensor of the mobile device, and wherein the one or more processors are configured to determine a transition of the mobile device based at least in part on a determination that the obtained information satisfies the set of criteria associated with at least one of the potential updated contexts.

11. The system of claim 10, wherein at least one set of criteria includes a minimum threshold criteria, such that the criteria is satisfied if a value is above the minimum threshold.

12. The system of claim 10, wherein at least one set of criteria includes criteria associated with a variance in potential information obtained from the at least one sensor.

13. The system of claim 10, wherein the obtained information is indicative of at least one of a velocity, a distance traveled, and a bearing associated with an environment of the mobile device.

14. A power-efficient method of assessing a context of a mobile device, the method comprising:

> determining, at a mobile device, a transition of the mobile device from a current context to an updated context defining whether the mobile device is available to establish communication with a third party device, wherein the determination is based at least in part on information obtained by the mobile device during each interval of a set of intervals, wherein the obtained information is not transmitted from the mobile device, and wherein the set of intervals is based at least in part on an anticipated variance of the obtained information; and
>
> responsive to the determined transition, modifying, without interaction with an external device, the set of intervals based at least in part on the updated context, wherein the modified set of intervals are defined by the updated context and correspond to an anticipated variance in information obtained during the updated context;
>
> wherein requests to establish communication between the mobile device and the third party device are managed based at least in part on the updated context, wherein each potential updated context of the mobile device is associated with a set of criteria, each set of criteria corresponding to potential information obtained from the at least one sensor of the mobile device, and wherein determining the transition of the mobile device is based at least in part on determining that the obtained information satisfies the set of criteria associated with at least one of the potential updated contexts.

15. The method of claim 14 further comprising transmitting a context change notification based at least in part on the determined transition.

16. The method of claim 15, wherein the context change notifications is transmitted only in response to the determined transition.

17. The method of claim 14, wherein at least one set of criteria includes criteria associated with at least one of a velocity, a distance traveled, and a bearing associated with an environment of the mobile device.

18. The method of claim 14, wherein at least one set of criteria includes criteria associated with a variance in potential obtained information.

* * * * *